United States Patent
Krishnaswamy et al.

(10) Patent No.: US 9,736,769 B2
(45) Date of Patent: Aug. 15, 2017

(54) ENERGY EFFICIENT QUALITY OF SERVICE AWARE COMMUNICATION OVER MULTIPLE AIR-LINKS

(75) Inventors: Dilip Krishnaswamy, San Diego, CA (US); Soumya Das, San Diego, CA (US); Amol Rajkotia, San Diego, CA (US); Krishnan Rajamani, San Diego, CA (US); Ozgur Dural, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1358 days.

(21) Appl. No.: 12/571,585

(22) Filed: Oct. 1, 2009

(65) Prior Publication Data

US 2011/0080868 A1    Apr. 7, 2011

(51) Int. Cl.
| | |
|---|---|
| *H04B 7/185* | (2006.01) |
| *H04W 48/18* | (2009.01) |
| *H04W 52/02* | (2009.01) |
| *H04W 72/12* | (2009.01) |
| *H04W 88/06* | (2009.01) |

(52) U.S. Cl.
CPC ........ *H04W 48/18* (2013.01); *H04W 52/0245* (2013.01); *H04W 72/1215* (2013.01); *H04W 88/06* (2013.01); *Y02B 60/50* (2013.01)

(58) Field of Classification Search
CPC .................................................. H04W 28/24
USPC ........................................................ 370/318
See application file for complete search history.

(56) References Cited

U.S. PATENT DOCUMENTS

| | | | |
|---|---|---|---|
| 4,953,210 A | 8/1990 | McGlynn et al. | |
| 7,406,055 B2 | 7/2008 | Taira et al. | |
| 7,444,127 B2 | 10/2008 | Laroia et al. | |
| 2004/0198406 A1* | 10/2004 | Gholmieh et al. | 455/522 |
| 2005/0261038 A1* | 11/2005 | Chary | H04W 52/0261 |
| | | | 455/574 |
| 2006/0218298 A1 | 9/2006 | Knapp et al. | |
| 2007/0217349 A1 | 9/2007 | Fodor et al. | |
| 2008/0069063 A1 | 3/2008 | Li et al. | |
| 2008/0101296 A1 | 5/2008 | Palin et al. | |
| 2008/0220788 A1 | 9/2008 | Stanwood et al. | |
| 2010/0130241 A1 | 5/2010 | Kitaji | |
| 2010/0329191 A1 | 12/2010 | Yokota | |

FOREIGN PATENT DOCUMENTS

| | | |
|---|---|---|
| CN | 101485222 A | 7/2009 |
| JP | 11298631 A | 10/1999 |

(Continued)

OTHER PUBLICATIONS

S. F. A. Shah and A. H. Tewfik., "Efficient Design of OFDMA-Based Programmable Wireless Radios", EURASIP Journal on Wireless Communications and Networking, Jan. 2008, pp. 1-10, vol. 2008, Article ID 516763, Hindawi Publishing Corporation.

(Continued)

*Primary Examiner* — Shripal Khajuria
(74) *Attorney, Agent, or Firm* — Qualcomm Incorporated

(57) ABSTRACT

A method, an apparatus, and a machine-readable medium are provided for wireless communication in which at least two modems are selected from a set of modems for the wireless communication based on quality of service requirements for and an energy consumption of the wireless communication. In addition, the selected at least two modems are utilized concurrently for the wireless communication.

58 Claims, 16 Drawing Sheets

(56) References Cited

FOREIGN PATENT DOCUMENTS

| JP | 2007529127 A | 10/2007 |
|----|--------------|---------|
| JP | 2008136118 A | 6/2008 |
| JP | 2008136134 A | 6/2008 |
| JP | 2009088976 A | 4/2009 |
| JP | 2009207003 A | 9/2009 |
| WO | WO2004040794 | 5/2004 |
| WO | 2005055524 A1 | 6/2005 |
| WO | WO2005062652 A1 | 7/2005 |
| WO | WO2008005091 A1 | 1/2008 |
| WO | 2008137132 A2 | 11/2008 |

OTHER PUBLICATIONS

Chebrolu, "Communication using Multiple Wireless Interfaces", Department of ECE, University of Caiifornia San Diego. pp. 327-331, 2002 IEEE.
Funk. Inverse Multiplexing in Short-Range Multi-Transport Wireless Communications, Brigham Young University, Computer Science Department, pp. 757-762, 2003 IEEE, Provo, Utah.
Lin, "Dynamic Bandwidth Aggregation for a Mobile Device with Multiple Interfaces", 5 pages.
Sharma, "Handheld Routers: Intelligent Bandwidth Aggregation for Mobile Collaborative Communities", Internet Systems and Storage Laboratory HP Laboratories Palo Alto, May 20, 2003, Palo Alto, CA, 16 pages.
International Search Report and Written Opinion—PCT/US2010/050710, International Search Authority—European Patent Office—Dec. 20, 2010.

\* cited by examiner

Spectral Occupancy for only Modem 1 operational

Spectral Occupancy for N simultaneously Operating Modems

| octets: 1 | 1 | 2 | N |
|---|---|---|---|
| Element ID (=255) | Length (=2+N) | Specifier ID | Application-specific Data |

FIG. 18

| Octets: 1 | 1 | 2 | 1 | ... | $M_N$ |
|---|---|---|---|---|---|
| Element ID (=15) | Length(=2+ $M_1$+...+$M_N$) | Specifier Id | Modem Capability 1 | ... | Modem Capability N |

FIG. 19

| Octets: 1 | 1 | 1 | 1 | 1 | X | 1 | ... | 1 |
|---|---|---|---|---|---|---|---|---|
| Modem Id | Length(=$M_i$-2=3+X+N) | Count | Country Code | Tx Power Level | Bitmap for modem incompatibility | Preferred Channel 1 | ... | Preferred Channel N |

FIG. 20

| octets: 1 | 1 | 2 | 2 | N |
|---|---|---|---|---|
| Element ID (=15) | Length (=4+N) | Target DevAddr | Specifier ID | Application-specific Request Information |

| Octets: 1 | 1 | 2 | 2 | 1 |
|---|---|---|---|---|
| Element ID (=15) | Length (=5) | Target DevAddr | Specifier ID | Application-specific Request Information |

FIG. 21

| Octets: 1 | 1 | 2 | 2 | $N_1$ | ..... | $N_P$ |
|---|---|---|---|---|---|---|
| Element ID (=255) | Length(=4+ $N_1$+..+$N_P$) | Target DevAddr | Specific Id | Link Measurement Request 1 | ..... | Link Measurement Request P |

FIG. 22

| Octets: 1 | 1 | 1 | .... | 1 |
|---|---|---|---|---|
| Modem Id | Length (=N) | Channel 1 | .... | Channel N |

FIG. 23

| Octets: 1 | 1 | 2 | 2 | 1 | 2 | ... | 2 |
|---|---|---|---|---|---|---|---|
| Element ID (=255) | Length(=5+2*N) | Target DevAddr | Specifier Id | Modem Selection Countdown | Modem Enable Request 1 | ... | Modem Enable Request N |

FIG. 24

| Octets: 1 | 1 |
|---|---|
| Modem Id | Channel |

FIG. 25

ENERGY EFFICIENT QUALITY OF SERVICE AWARE COMMUNICATION OVER MULTIPLE AIR-LINKS

BACKGROUND

Field

The present disclosure relates generally to communications and, more particularly, to energy efficient quality of service (QoS) aware communication over multiple air-links.

Background

Wireless communication systems are widely deployed to provide various telecommunication services such as telephony, video, data, messaging, and broadcasts. Typical wireless communication systems may be multiple-access systems capable of supporting communication with multiple users by sharing available system resources (e.g., bandwidth, transmit power). Examples of such multiple-access systems include code division multiple access (CDMA) systems, time division multiple access (TDMA) systems, frequency division multiple access (FDMA) systems, orthogonal frequency division multiple access (OFDMA) systems, and single-carrier frequency divisional multiple access (SC-FDMA) systems. The systems can conform to specifications of the Third Generation Partnership Project (3GPP), such as, for example, 3GPP Long Term Evolution (LTE). LTE is a set of enhancements to the Universal Mobile Telecommunications System (UMTS) mobile standard in order to improve spectral efficiency, lower costs, improve services, make use of new spectrum, and better integrate with other open standards.

Generally, wireless multiple-access communication systems may simultaneously support communication for multiple user equipment (UE). Each UE may communicate with a base station (BS) via transmissions on forward and reverse links. The forward link (or downlink (DL)) refers to the communication link from the BSs to UEs, and the reverse link (or uplink (UL)) refers to the communication link from UEs to the BSs. Communications between UEs and BSs may be established via single-input single-output (SISO) systems, single-input multiple-output (SIMO) systems, multiple-input single-output (MISO) systems, multiple-input multiple-output (MIMO) systems. UEs can communicate with other UEs (and/or BSs with other BSs) in peer-to-peer wireless network configurations.

Current mobile handsets and laptops support short distance wireless communication using 802.11a/b/g/n. Emerging handsets and laptops will need to support very high speed data transfer at very short distances using energy efficient methods. Ultra-wideband (UWB) is a wireless personal area network (WPAN) technology that can be used at low energy levels for short-range high-bandwidth communications. IEEE 802.11 is a wireless local area network (WLAN) technology for longer range transmissions. UWB WPAN modems may be used for various high-speed, short-range applications, such as high speed storage syncing between a laptop and a handset and streaming high-definition (HD) video from a handset to a display. IEEE 802.11 WLAN modems may be used in other longer-range applications, such as browsing the Internet.

SUMMARY

In an aspect of the disclosure, a method for wireless communication is provided in which at least two modems are selected within an apparatus from a set of modems for a wireless communication based on quality of service requirements for and an energy consumption of the wireless communication. In addition, the selected at least two modems are utilized concurrently for the wireless communication.

In another aspect of the disclosure, an apparatus for wireless communication includes means for selecting, within an apparatus, at least two modems from a set of modems for a wireless communication based on quality of service requirements for and an energy consumption of the wireless communication. The apparatus further includes means for utilizing the selected at least two modems concurrently for the wireless communication.

In another aspect of the disclosure, a machine-readable medium is provided having stored thereon instructions that, when executed, direct a machine to select, within an apparatus, at least two modems from a set of modems for a wireless communication based on quality of service requirements for and an energy consumption of the wireless communication. The machine is further directed to utilize the selected at least two modems concurrently for the wireless communication.

In another aspect of the disclosure, an apparatus for wireless communication includes a wireless interface and a processing system. The wireless interface includes a set of modems. The processing system is coupled to the wireless interface and is configured to select at least two modems from the set of modems for a wireless communication based on quality of service requirements for and an energy consumption of the wireless communication. The processing system is further configured to utilize the selected at least two modems concurrently for the wireless communication.

BRIEF DESCRIPTION OF THE DRAWINGS

FIG. 18 illustrates the ASIE format for modern capability support.

FIG. 19 illustrates a format of the modern capability field.

FIG. 20 illustrates an application specific probe IE format.

FIG. 21 illustrates an application specific probe IE format for device capability.

FIG. 22 illustrates an ASIE format for a link measurement request.

FIG. 23 illustrates a link measurement request format.

FIG. 24 illustrates an ASIE format for modem selection.

FIG. 25 illustrates a modem enable request field format.

DETAILED DESCRIPTION

Figure 1:
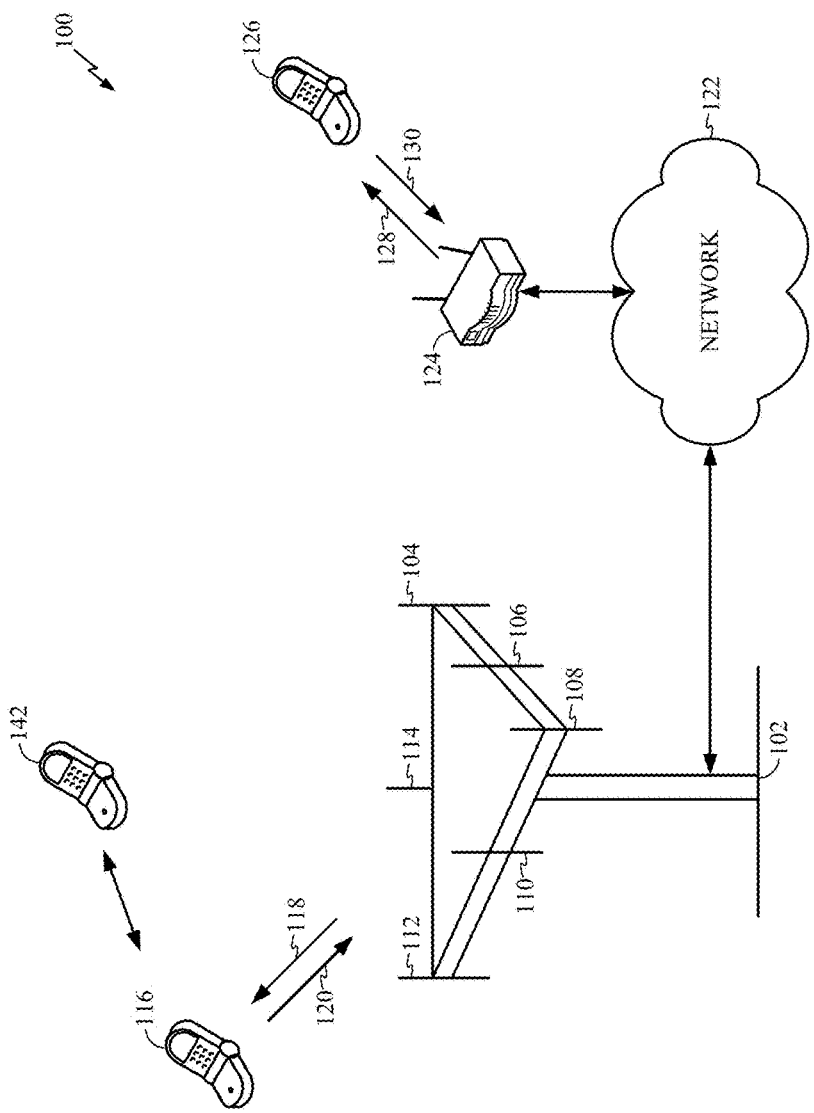
FIG. 1 is an illustration of a wireless communication system.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," and "system" are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a UE. A UE can also be called a mobile device, system, subscriber unit, subscriber station, mobile station, mobile, remote station, remote terminal, access terminal, user terminal, terminal, wireless communication device, user agent, user device, or device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A BS can be utilized for communicating with UEs and can also be referred to as an access point, Node B, evolved Node B (eNode B or eNB), base transceiver station (BTS), or some other terminology.

Moreover, various aspects or features described herein can be implemented as a method, apparatus, or article of manufacture using standard programming and/or engineering techniques. The term "article of manufacture" as used herein is intended to encompass a computer program accessible from any machine-readable device, carrier, or media. Machine-readable media can include but are not limited to magnetic storage devices (e.g., hard disk, floppy disk, magnetic strips), optical disks (e.g., compact disk (CD), digital versatile disk (DVD)), smart cards, flash memory devices (e.g., EPROM, card, stick, key drive), random access memory (RAM), a read only memory (ROM), a programmable ROM (PROM), an erasable PROM (EPROM), registers, a removable disk, a carrier wave, a transmission line, any other suitable storage device, or any other apparatus or means through which the instructions may be transmitted.

The techniques described herein may be used for various wireless communication systems such as CDMA, TDMA, FDMA, OFDMA, and SC-FDMA. The terms "system" and "network" are often used interchangeably. A CDMA system may implement a radio technology such as Universal Terrestrial Radio Access (UTRA) or CDMA2000. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, or Flash-OFDM. UTRA and E-UTRA are part of Universal Mobile Telecommunication System (UMTS). 3GPP LTE is a release that uses E-UTRA, which employs OFDMA on the downlink, SC-FDMA on the uplink, and multiple-input multiple-output (MIMO) antenna technology to support more users and higher data rates. UTRA, E-UTRA, UMTS, LTE and GSM are described in documents from the 3GPP organization. CDMA2000 and UMB are described in documents from the 3rd Generation Partnership Project 2 (3GPP2) organization.

Referring now to FIG. 1, a wireless communication system 100 is illustrated. The system 100 includes a BS 102. The BS 102 can communicate with one or more UEs such as the UE 116 and the UE 126. However, it is to be appreciated that the BS 102 can communicate with substantially any number of UEs similar to the UEs 116 and 126. As depicted, the UE 116 is in communication with the antennas 112 and 114. The antennas 112 and 114 transmit information to the UE 116 over a forward link 118 and receive information from the UE 116 over a reverse link 120.

As shown in FIG. 1, the BS 102 can communicate with a network 122, such as a service provider's network, over a backhaul link connection. A femtocell 124 can be provided to facilitate communication with the UE 126 over the forward link 128 and the reverse link 130 (similarly to the forward link 118 and the reverse link 120, as described supra). The femtocell 124 can provide access to one or more UEs 126 much like the BS 102, but on a smaller scale. The femtocell 124 can be configured in a residence, business, and/or other close range setting. The femtocell 124 can connect to the network 122 utilizing a backhaul link connection, which can be over a broadband Internet connection (e.g., T1/T3, digital subscriber line (DSL), cable).

The UEs 116 and 126 may also communicate directly with another device using a peer-to-peer or ad hoc technology. For example, as shown in FIG. 1, the UE 116 may communicate directly with the UE 142.

Figure 2:
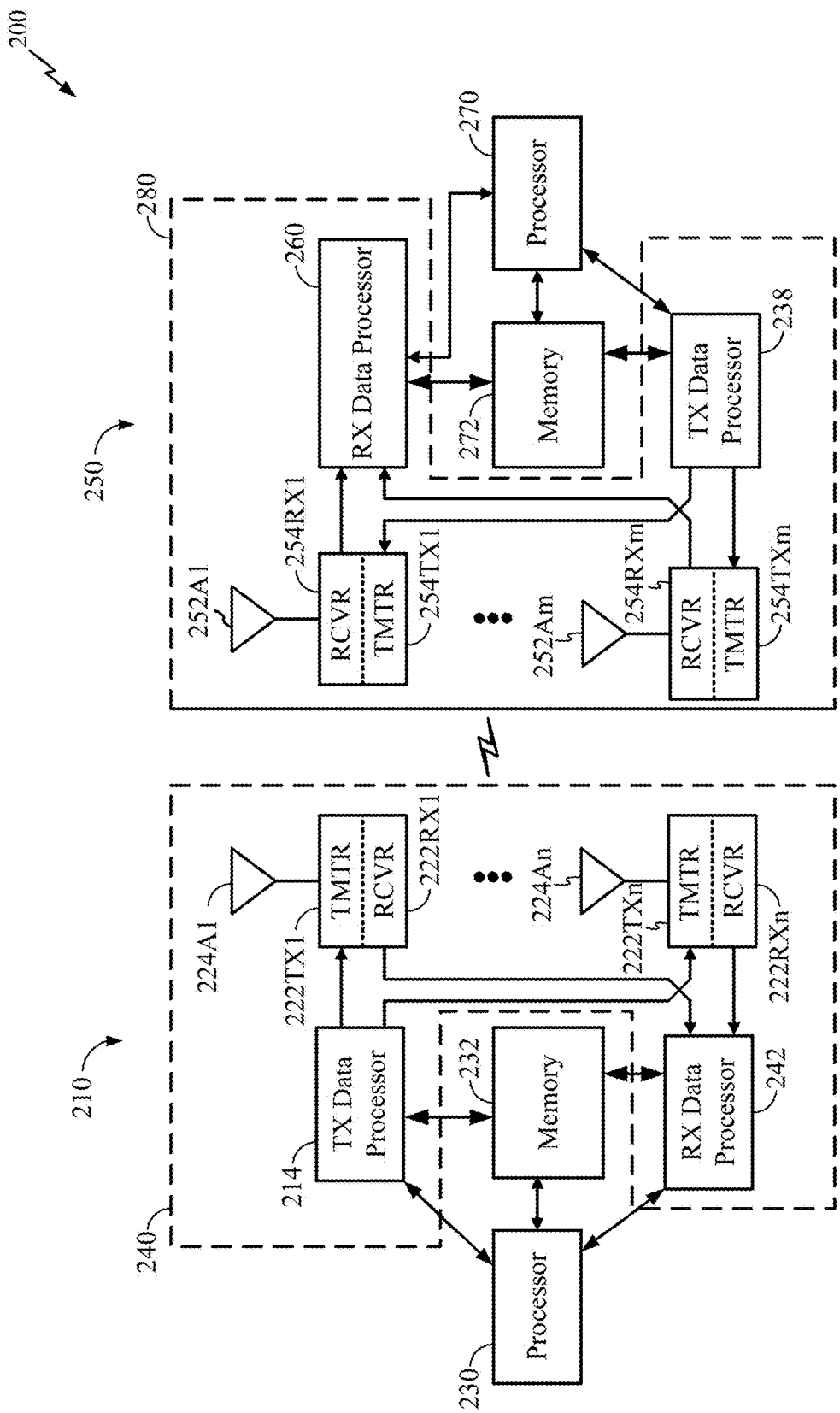
FIG. 2 is a block diagram of a wireless communication system.

FIG. 2 is a block diagram of a wireless communication system 200. The wireless communication system 200 depicts block diagrams for a UE 210 in communication with another UE 250. At UE 210, the TX data processor 214 formats, codes, and interleaves data streams based on a particular coding scheme selected for each data stream. The TX data processor 214 can modulate the coded data for each data stream based on a particular modulation scheme (e.g., binary phase-shift keying (BPSK), quadrature phase-shift keying (QPSK), M-phase-shift keying (M-PSK), M-quadrature amplitude modulation (M-QAM)) selected for that data stream to provide modulation symbol streams. The data rate, coding, and modulation for each data stream can be determined by instructions performed or provided by the processor 230.

The UE 210 includes a set of modems 240. Each modem may be represented as a TX data processor, a RX data processor, and one or more transceivers 222Tx/222Rx and corresponding antennas 224A. As such, the TX and RX data processors 214, 242 may each include multiple TX and RX data processors, respectively, if the UE 210 includes two or more modems.

The UE 250 includes a set of modems 280. Each modem may be represented as a TX data processor, a RX data processor, and one or more transceivers 254Tx/254Rx and corresponding antennas 252A. As such, the TX and RX data processors 238, 260 may each include multiple TX and RX data processors, respectively, if the UE 250 includes two or more modems.

The RX data processor 260 demodulates, deinterleaves, and decodes the received data. The processing by RX data processor 260 is complementary to that performed by the TX data processor 214 at the UE 210.

The processor 270 can formulate a message. The message is processed and modulated by a TX data processor 238, conditioned by one or more of the transmitters 254TX, and transmitted back to the UE 210.

At the UE 210, the modulated signals from the UE 250 are received by one or more of the antennas 224A, conditioned by the corresponding receivers 222RX, and demodulated and processed by a RX data processor 242 to extract the message transmitted by the UE 250.

The processors 230 and 270 can direct (e.g., control, coordinate, manage) operation at the UE 210 and the UE 250, respectively. The respective processors 230 and 270 can be associated with a machine-readable medium 232 and 272 that store program codes and data.

Figure 3:
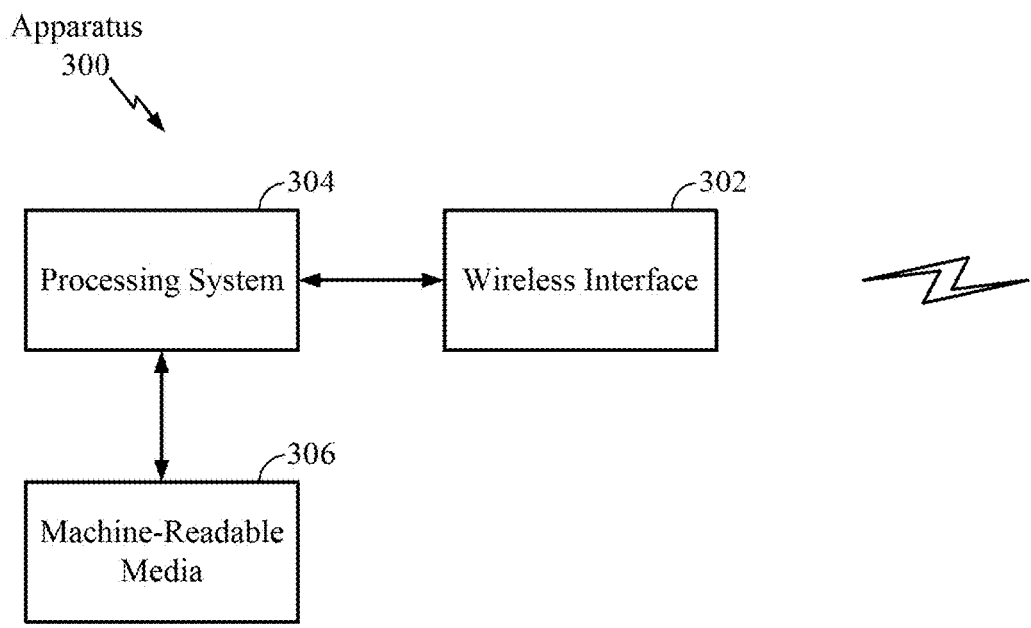
FIG. 3 is a block diagram illustrating a configuration for an apparatus.

FIG. 3 is a block diagram illustrating a configuration for an apparatus 300. The apparatus 300 may include a wireless interface 302, a processing system 304, and machine-readable media 306. The apparatus 300 corresponds to either of the UEs 210, 250. When the apparatus 300 corresponds to the UE 210, the processing system 304 corresponds to the processor 230; the machine-readable media 306 corresponds to the memory 232; and the wireless interface 302 corresponds to the set of modems 240, which includes the antennas 224A, the transceivers 222, the TX data processor 214, and the RX data processor 242. When the apparatus 300 corresponds to the UE 250, the processing system 304 corresponds to the processor 270; the machine-readable media 306 corresponds to the memory 272; and the wireless interface 302 corresponds to the set of modems 250, which includes the antennas 252A, the transceivers 254, the TX data processor 238, and the RX data processor 260.

The wireless interface 302 may be integrated into the processing system 304 or distributed across multiple entities in the apparatus. The processing system 304 may be implemented with one or more processors. The one or more processors may be implemented with any combination of general-purpose microprocessors, microcontrollers, digital signal processors (DSPs), digital signal processing devices (DSPDs), field programmable gate array (FPGAs), programmable logic devices (PLDs), controllers, integrated circuits (ICs), application specific ICs (ASICs), state machines, gated logic, discrete hardware components, or any other suitable entities that can perform calculations or other manipulations of information.

The processing system 304 is coupled to machine-readable media 306 for storing software. Alternatively, the processing system 304 may itself include the machine-readable media 306. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 304 to perform the various functions described below, as well as various protocol processing functions.

The wireless interface 302 may be configured to provide the complete physical layer implementation of the UE 116. The physical layer implementation will depend on the particular application and the overall design constraints imposed on the system. The processing system 304 is configured to implement all functionality above the physical layer and to use the transmitting and receiving functions of the wireless interface 302 to support communications with other wireless devices.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, and/or data can be passed, forwarded, or transmitted using any suitable means including memory sharing, message passing, token passing, and network transmission.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

As discussed supra, the wireless interface 302 may be referred to as a set of modems in which the set includes one or more modems. In one example, the set includes a UWB WPAN modem and an IEEE 802.11 WLAN modem. When a device includes both the USB WPAN modem and the IEEE 802.11 WLAN modem, generally only a single modem is active at any given time. However, both modems may be utilized at the same time. In one usage scenario, the UWB WPAN modem is utilized for short-range high-speed communications, but the performance of the modem is impaired due to channel impairments such as fading, obstacles, or the devices in communication being too far apart. As such, the UWB WPAN modem may not be able to provide the requisite throughput for the application. In this case, the IEEE 802.11 WLAN modem may be enabled to bridge the deficit at the given distance. In one configuration, the modems utilized for the data transfer are selected based on satisfying QoS metrics for and minimizing energy consumption of the data transfer.

Various consumer electronics such as televisions, DVD players, and set-top boxes may be enabled with wireless radios. With the proliferation of radios within a given area, the density of radio communication will increase and therefore the probability of interference with the electronic equipment will increase as well. As such, it would be beneficial to equip the electronic equipment with multiple radios and select the best combination of radios to enhance the end-user experience. The multiple radios may cooperate with each other to achieve the desired throughput while maximizing energy efficiency.

Current UWB performance is extremely range limited. For example, link budget calculations indicate that in order to support 960 Mbps using a 32 KB payload, the expected range is only about 0.8 meters. This mode is currently not supported by ECMA-368, but is expected to be an option in future versions of the standard. For products currently available on the market, actual range/rate data is available. For example, the current WUSB throughput is about 50 Mbps from approximately 2 ft to 8 ft.

The theoretical UWB throughput is higher. For example, according to simulations, by using a peak PHY rate of 480 Mbps with 4 KB packets in 32 frame bursts, the achieved throughput is ~375 Mbps at ~0.6 m (2 ft).

For WiQuest UWB Dock, using a peak PHY rate of 480 Mbps at 2 ft in a line-of-sight (LOS) environment and without a hand/body impact on the antenna results in a throughput of less than 50 Mbps. The reduced rate could be due software and I/O limitations. However, even with optimizations, the throughput with WiQuest UWB Dock may be significantly lower than the peak rate. In a realistic environment, the device is likely to operate within a non-line-of-site (NLOS) environment and experience an antenna gain reduction. Further, any form of interference is likely to further impair the demodulation performance. All these factors will result in lowering the throughput at a given range. Alternatively, to meet the desired throughput, the range between the receiving and transmitting devices may be significantly reduced. However, this option would degrade the end-user experience.

Without reducing the range (i.e., moving the UE closer to the device with which the UE is communication), lowering the throughput would necessitate reducing the application requirements. For example, consider a VGA video content sent from the UE to a display (640×480, 30 fps, 24 bpp) requiring ~221 Mbps throughput. If at a given range, the required throughput of 221 Mbps cannot be sustained due to channel impairments, then the UE and the display may need to reduce their requirements to a QVGA stream 320×240, 30 fps, 24 bpp requiring only 55.3 Mbps throughput. Alternatively, as discussed supra, the distance between the UE and the display may be reduced to sustain the original requirement of 221 Mbps. However, both of these options would limit the usefulness of the wireless solution.

For WLAN, the maximum throughput is 25 Mbps for up to about 50 ft. Consider the previous example of streaming VGA content. If the channel conditions limited the throughput of the UWB modem to about 210 Mbps, and the UE and the display had a WLAN modem, the WLAN modem could be used to bridge the 11 Mbps deficit. As such, the application would not need to throttle down its requirement to QVGA. Table 1 summarizes the throughput results.

TABLE 1

Throughput Summary

| Product | Throughput @ 2 feet (Mbps) |
|---|---|
| UWB Belkin F5U302 | 50 |
| UWB WiQuest Dock | ~46 |
| UWB (simulations) | 375 |
| 802.11g (expected) | 25 |

Figure 4:
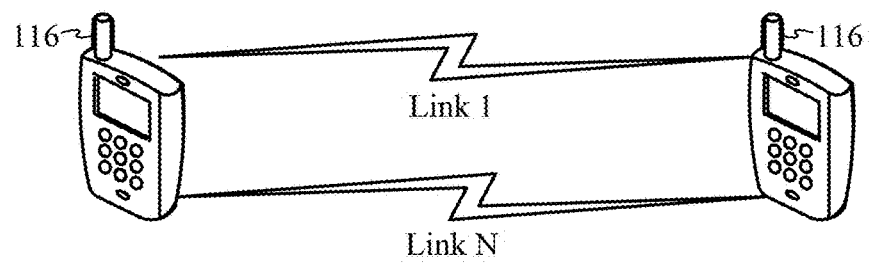
FIG. 4 illustrates a peer-to-peer file exchange.
Figure 5B:
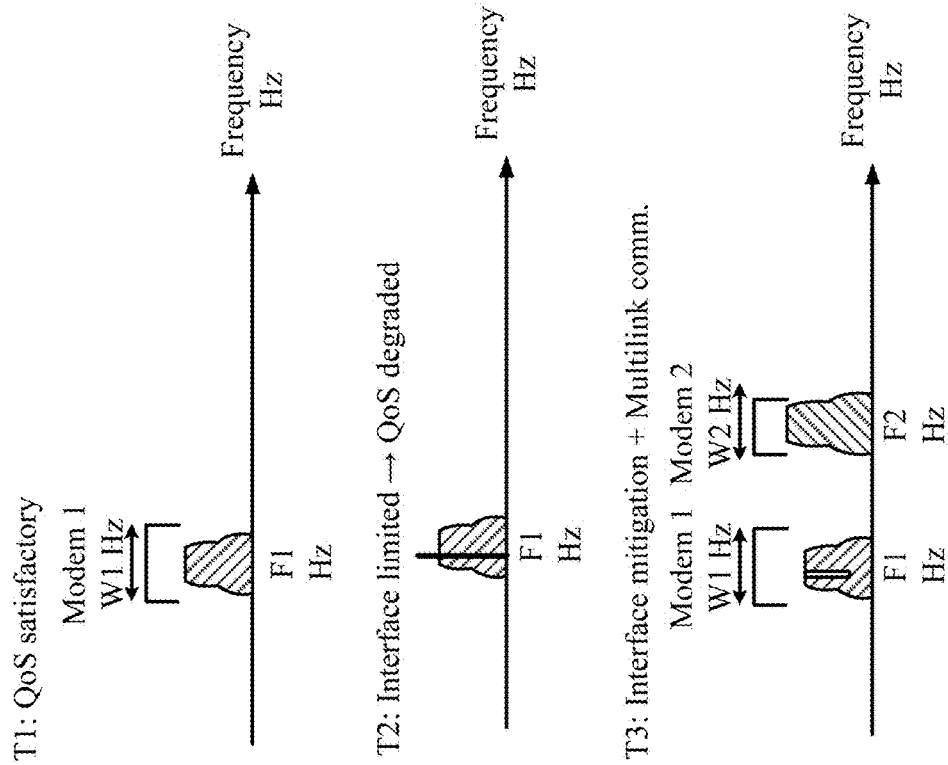
FIG. 5b illustrates the time evolution of a single link to a multilink message.
Figure 5A:
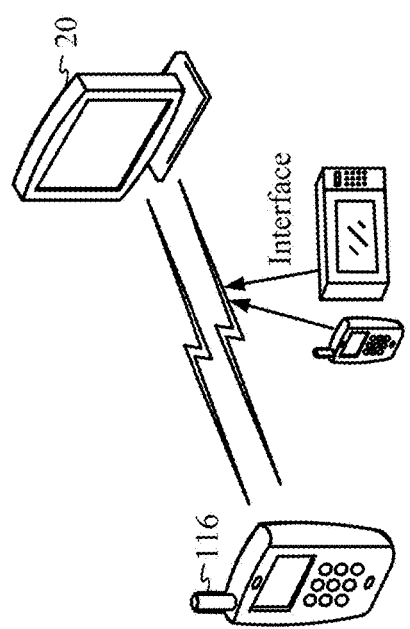
FIG. 5a illustrates video streaming in the presence of interference.
Figure 6:
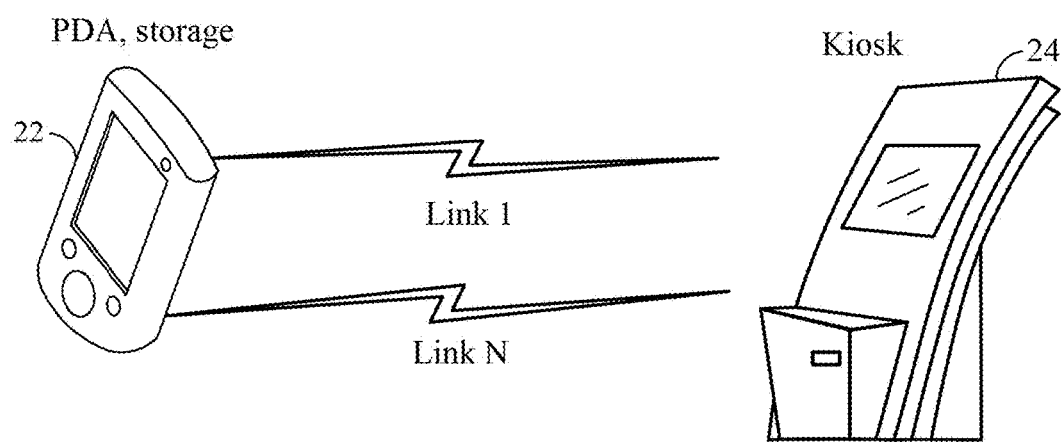
FIG. 6 illustrates content being downloaded from a kiosk.

FIGS. 4-6 depict several use cases in which the ability to use more than one air-link would improve the user experience. FIG. 4 shows a peer-to-peer file exchange between two multimode UEs 116. Each UE 116 could be equipped with both a WiFi modem and a FlashLinQ modem, for instance. The devices could be configured to simultaneously operate both these modems to improve the data transfer rate between the devices. In this example, no interference is considered and the only impairments are due to the channel or other link budget limitations (range, antenna/body loss, etc.).

FIG. 5a depicts a scenario of a UE 116 using multiple air-links to stream content to a display 20 while experiencing interference. FIG. 5b shows the sequence of events leading up to the usage of multiple air-links. At time instance T1, a single air-Link is sufficient to meet the QoS requirements for the communication between the UE 116 and the display 20. At time instance T2, the presence of interference within the frequency band of use degrades the QoS. At time instance T3, the UE 116 applies various interference mitigation techniques to improve the performance, such as for example, notching out the interference. If the target QoS requirements are still not satisfied, the UE 116 enables a secondary communication link to meet the QoS requirements.

FIG. 6 depicts a scenario of a PDA or a pocketable computing device (PCD) 22 downloading movies from a kiosk 24. The kiosk 24 may not be constrained by area or power consumption requirements and hence, can support a multitude of modems to maximize its ability to communicate with as many devices as possible. One PDA may be equipped with only WiFi and UWB while another may be equipped with WiFi and FlashLinq. However, the kiosk 24 may be equipped with all types of modems, and therefore serve both devices.

Figure 7:
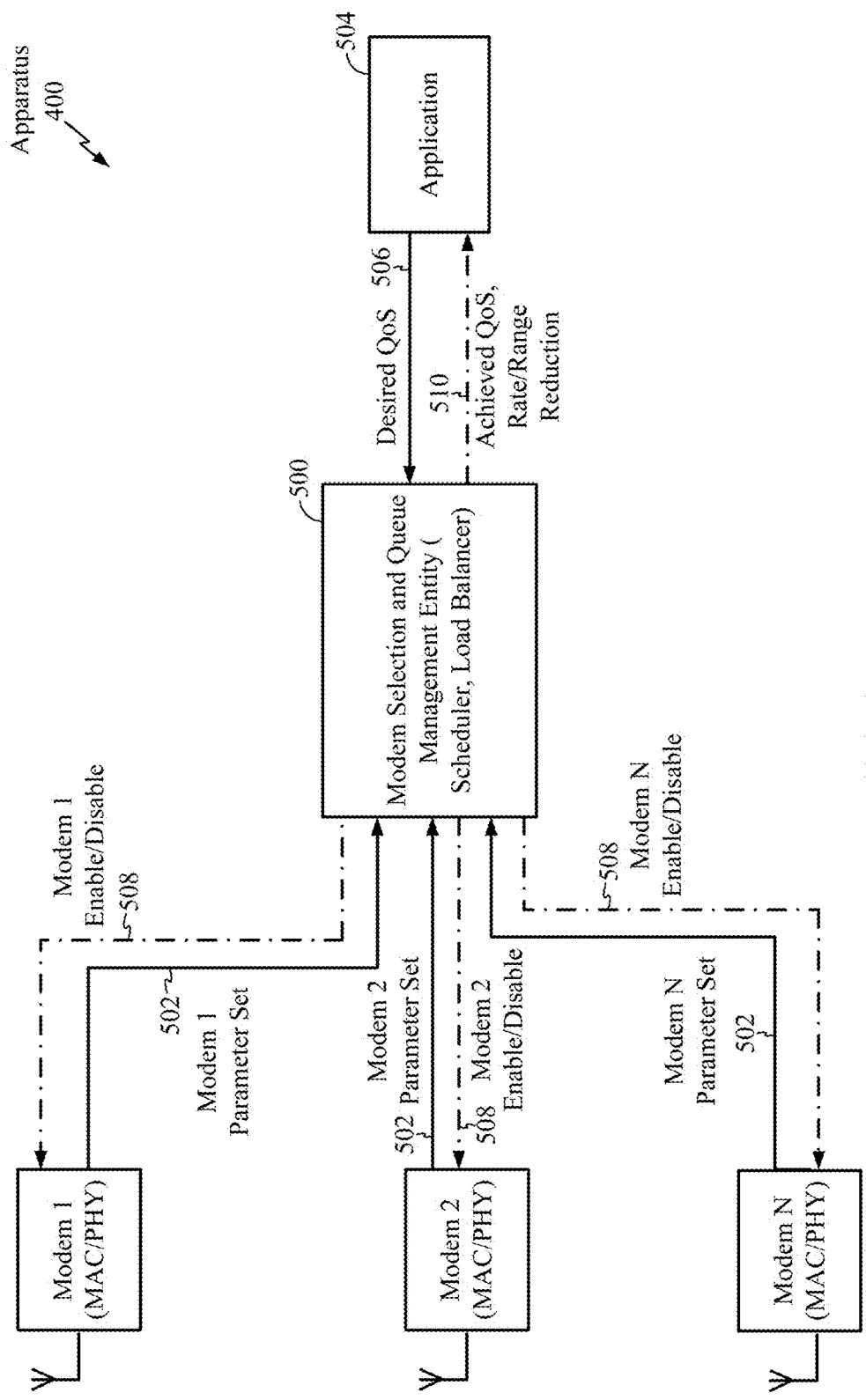
FIG. 7 is a more detailed block diagram of the apparatus of FIG. 4.
Figure 8:
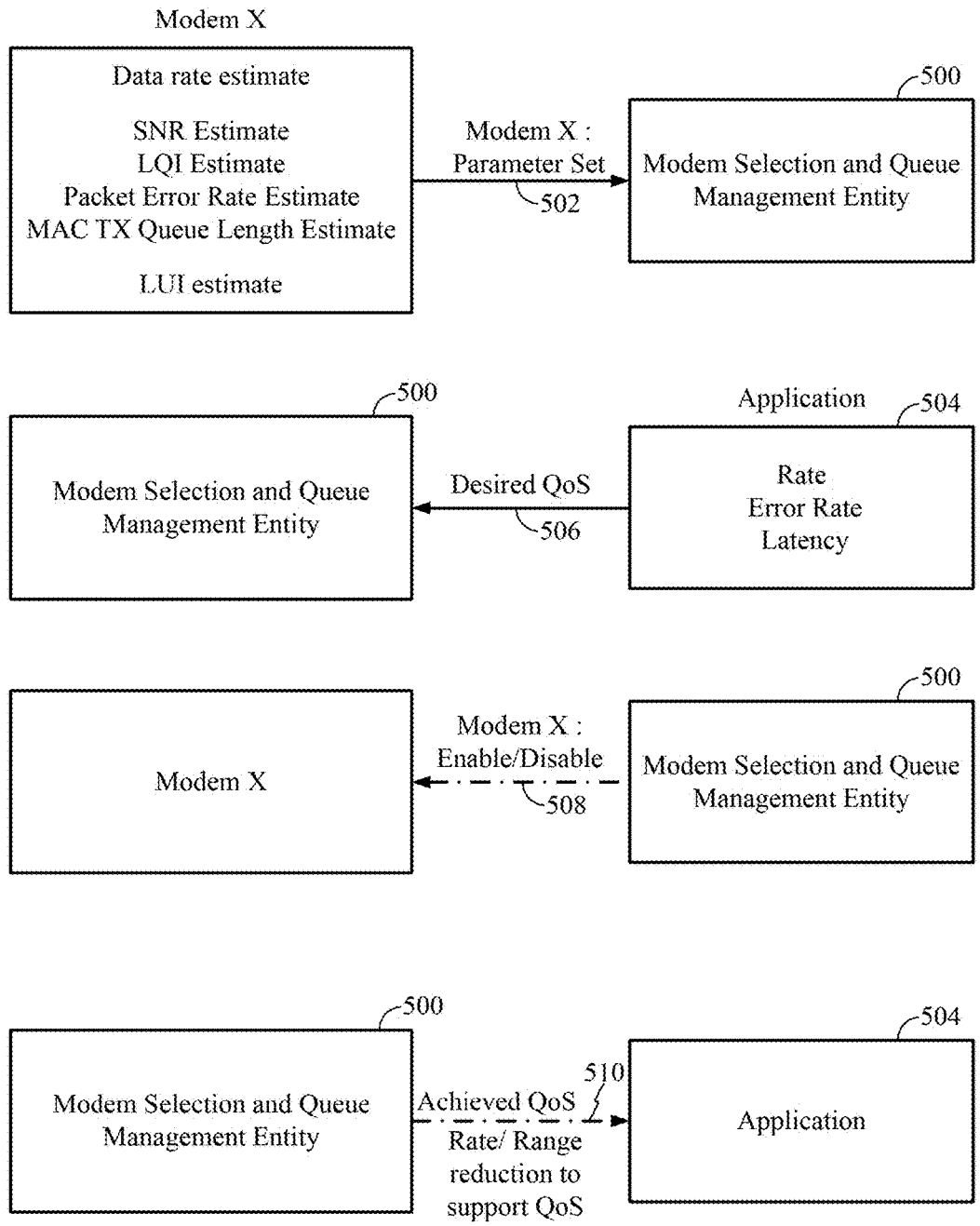
FIG. 8 depicts the information exchange corresponding to FIG. 8.

FIGS. 7 and 8 are block diagrams illustrating the functionality of an exemplary UE apparatus 300. In FIG. 7, modems 1 through N are part of the wireless interface 302, the Modem Selection and Queue Management Entity (MSQME) 500 is part of the processing system 304, and the Application runs on the processing system 304. Each of the N modems provides a parameter set 502 to the MSQME 500. The MSQME 500 performs modem selection and scheduling. The parameter sets 502 each include estimations related to a data rate, a signal-to-noise ratio, a link quality indicator (LQI), a link utilization indicator (LUI), a packet error rate, and/or a media-access-control (MAC) transfer queue length. The Application 504 provides a desired QoS 506 to the MSQME 500. The desired QoS 506 includes a bit rate, a bit error rate, and a latency. The bit rate may be a physical layer, MAC layer, logical link control (LLC) layer, network layer, transport layer, session layer, presentation layer, or application layer bit rate. Based on the parameter set 502, the desired QoS 506, and minimizing the energy consumption of the selected modems, the MSQME 500 enables/disables M modems of the N modems, where M≥2 (508). The MSQME 500 may also enable/disable the modems based on compatibilities or incompatibilities between the modems. If the QoS 506 cannot be satisfied, the MSQME 500 may request a QoS and/or rate/range reduction 510 from the Application 504.

In one configuration, to achieve a requested rate at a requested range within a specified latency margin, the most energy efficient M modems are operated at capacity before utilizing the next modems. Channel conditions, error events, delay, and power consumption are monitored and used to determine capacity (rates) of modems. The capacity of each modem is determined when need arises, at link initialization or periodically via polling of various modems. The measured values of error rate, link quality, and the like are used with the desired application requirements to select modems to close the communication link.

As discussed supra, for modem selection, the MSQME 500 uses metrics from the various modems as well as the desired QoS requirements 506 from the application to determine the set of M out of N modems to utilize for the wireless communication. Once the M modems have been selected, the entity is responsible for multiplexing the application traffic onto the various modems.

Figure 9:
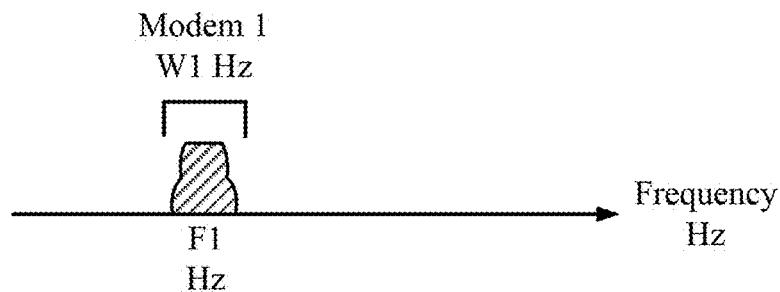
FIG. 9 illustrates the spectral occupancy of a single operational modem.
Figure 10:
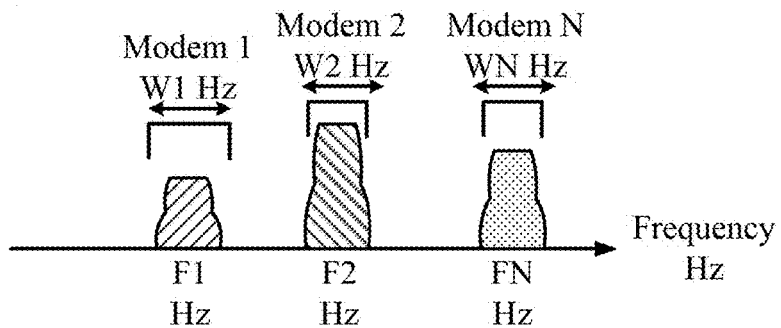
FIG. 10 illustrates the spectral occupancy of N simultaneously operating modems.
Figure 11:
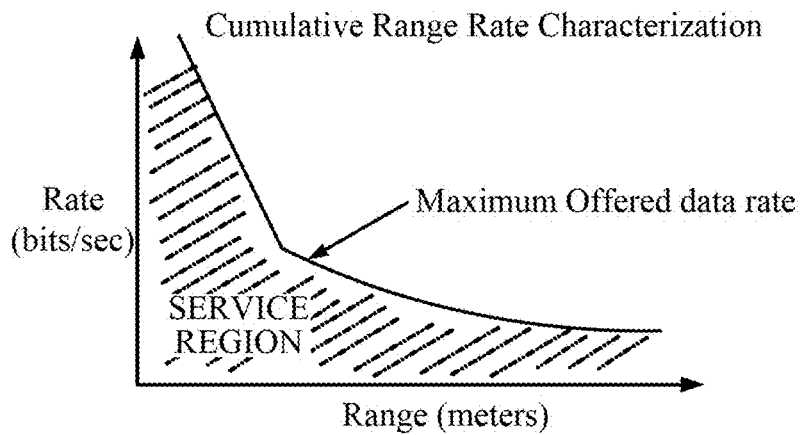
FIG. 11 illustrates a cumulative range/rate characterization.

FIG. 9 shows the spectral occupancy of a device with only a single modem and FIG. 10 shows the spectral occupancy of a device when more than one modem is active. If each modem has a specific range versus rate characteristic, then as shown in FIG. 11, a cumulative range/rate plot can be determined for multiple active modems to meet the desired throughput requirements.

Figure 12:
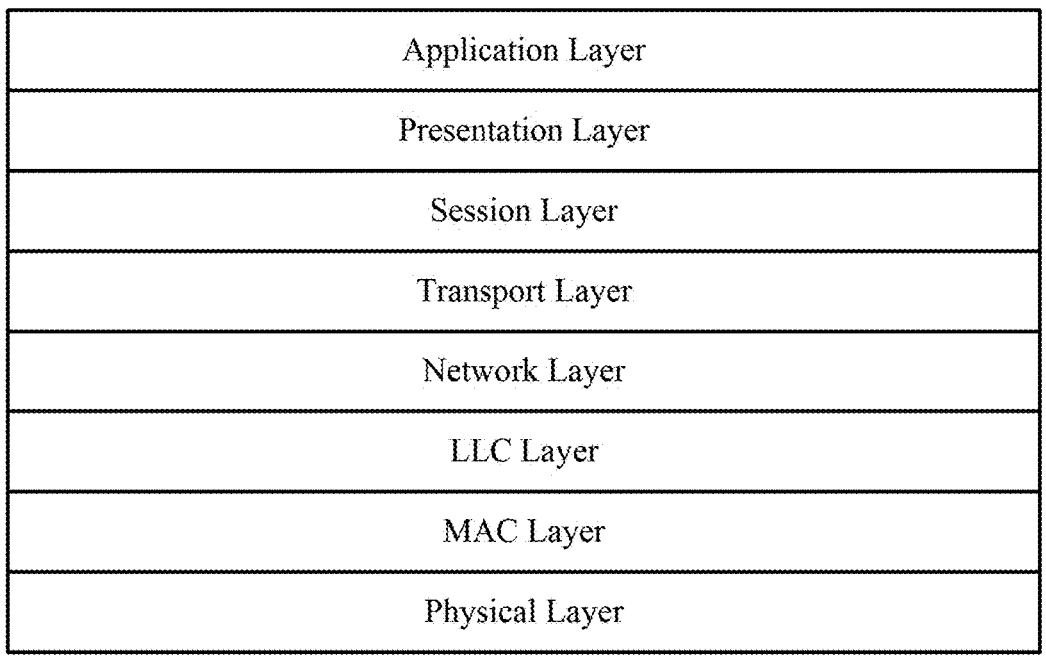
FIG. 12 illustrates the protocol stack of single modem.
Figure 13:
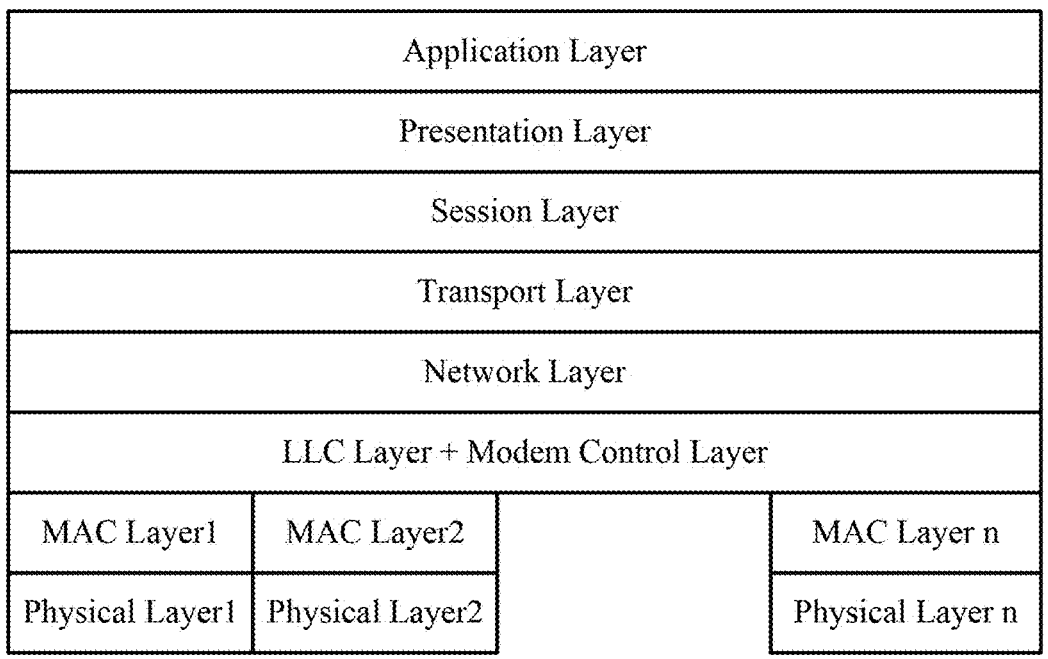
FIG. 13 illustrates a proposed protocol stack with multiple modems.

FIG. 12 shows a protocol stack of an individual modem and FIG. 13 shows a proposed protocol stack with multiple modems. As shown in FIG. 13 as compared to FIG. 12, the protocol stack may be modified for the proposed modem selection methods such that there are separate MAC and PHY layers corresponding to each modem. As such, error control and flow control (if any) will be independent for each modem. The LLC layer puts the application packets into the different transmission queues (one to one mapping between transmission queue and modem) while the modems to be used are determined by the MSQME 500. The MSQME 500 in the LLC layer performs the task of deciding how many and which modems to be used for supporting the current user requirement by picking the most optimal modem first and then choosing the next optimal one until the rate requirement is met such that the transmission delay and residual error rate are within tolerance limits.

Two distinct modem selection methods are proposed. In the modem selection methods, the following definitions/assumptions apply:

Rapp=Effective rate required at PHY to sustain app. layer rate (depends on MAC efficiency)

Rij=PHY rate of ith modem running jth modulation and coding scheme (MCS),
   i=1, 2, . . . , n & j=1, 2, . . . , li
   li is the number of MCS for ith modem Si=Rate independent fixed platform energy for ith modem Eij=Energy per bit for ith modem running jth MCS Eij'=Approx. energy per bit for ith modem running jth MCS=Pij/Rij Pij=Total power consumption for ith modem running jth MCS
   (Si+Eij*Rij)/Rij Assume 100% utilization for each modem, else require scaling of Rij with channel utilization factor Modem Selection Method 1

If there is no knowledge of Si or Eij and only Pij is known based on lab measurements, then
   for n modems
      each modem has different MCS combinations
      each modem independently chooses the optimal MCS according to link quality pick most energy efficient modem with lowest Eij' and use to its capacity
   move to next energy efficient modems until Rapp is satisfied
      $R'_{kj}=R_{kj}$ if k is not the modem with max(Eij');
      else $R'_{kj}$ is difference in required rate and sum of rates from
      all other modems running at max rate for corresponding MCS.

Figure 14:
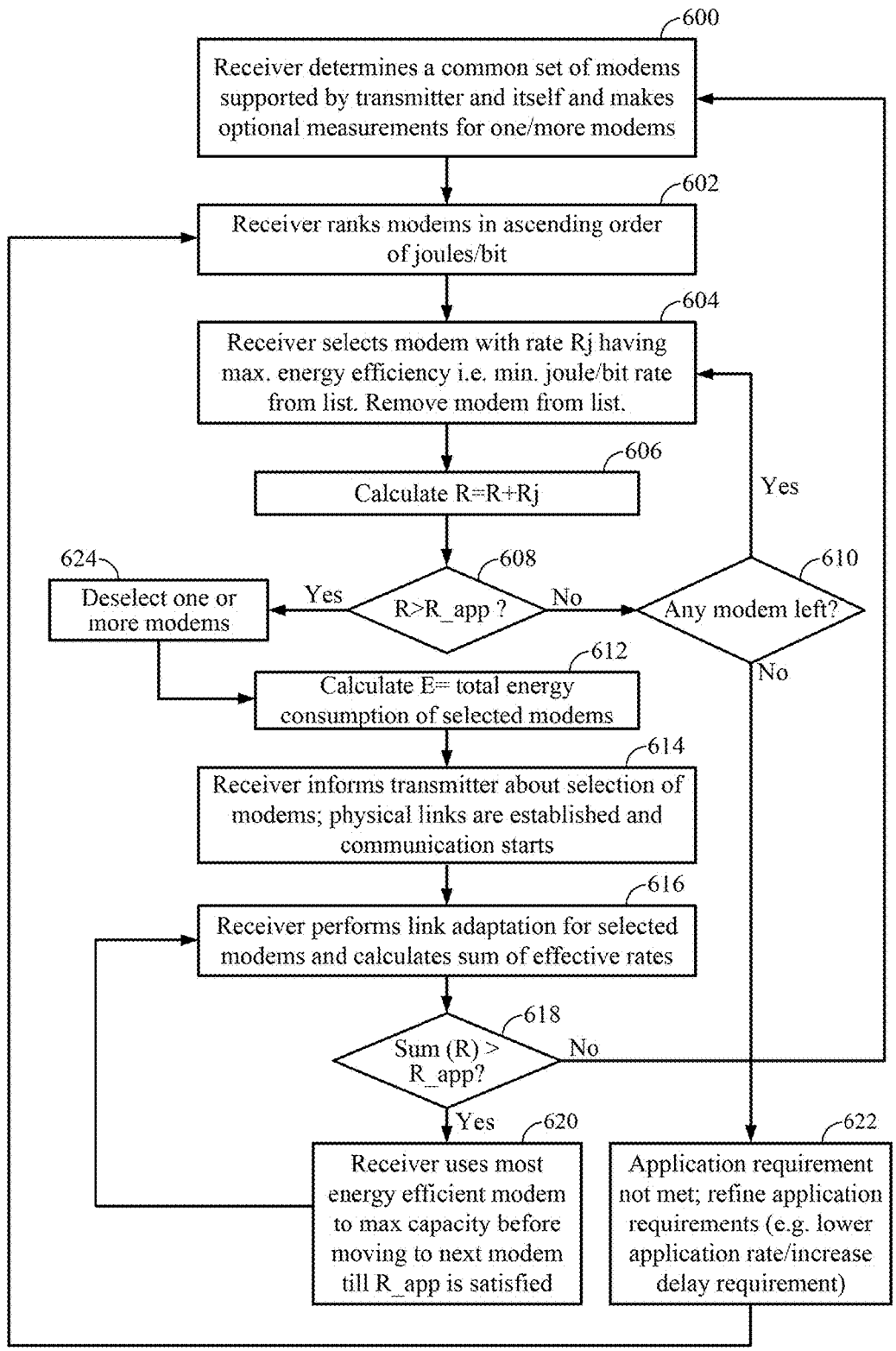
FIG. 14 is a flowchart of a modem selection method according to a first configuration.

FIG. 14 is a flow chart of a modem selection method of a first configuration for the processing system 304. As shown in FIG. 14, the receiving device determines a common set of modems supported by itself and the transmitting device and may make additional measurements for one or more of the common modems (600). While FIG. 14 is directed to a receiving device, the flow chart is also applicable to a transmitting device. Next, the receiving device ranks modems in ascending order of their energy efficiency (602). The receiving device then selects the modem with the best energy efficiency (604). If the capacity bit rate (606) of the selected modem is insufficient to satisfy the requisite bit rate as required by the QoS requirements of the Application 504 (608), the next best energy efficient modem is selected (604) if there are additional modems that can be utilized (610). If there are no additional modems that can be utilized, the receiving device lowers the application QoS requirements (622). Once the most energy efficient modems have been selected with a combined capacity bit rate that would satisfy the requisite bit rate as required by the QoS requirements, the total energy consumption is calculated (612). The receiving device informs the transmitting device of the selection of modems and physical links are established for the wireless communication (614). The receiving device performs link adaptation for selected modems and calculates the sum of effective rates (616). If the sum is greater than the requisite bit rate (618), the receiving device will use the most energy efficient modem to the maximum capacity before utilizing the next modem (620).

In an additional configuration, the receiving device may deselect one or more of the modems selected at 604 to reduce energy consumption if the sum of the capacity bit rates of the other selected modems is greater than or equal to the requisite bit rate (624).

Table 2 below provides an example of energy efficiencies and capacity bit rates for a plurality of modems. Generally, Eij' may include two components: a dependent component that is dependent on the bit rate and an independent component that is independent of the wireless communication. The independent component is an energy consumed by the modem being in an on-state and the dependent component is an energy consumed as a function of the data transfer. As shown in Table 2, Eij' includes only the dependent component, but Eij' may include the independent component only, or both the dependent and independent components.

TABLE 2

Energy Table

| | Modem 1 | Modem 2 | Modem 3 | Modem 4 |
|---|---|---|---|---|
| Eij' (Joule/Mbit) | 0.06 | 0.065 | 0.075 | 0.08 |
| Rij (Mbps) | 50 | 80 | 100 | 150 |

If the desired Rapp is 180 Mbps, then according to the modem selection method 1 and FIG. 14, the receiving device would select modems 1, 2, and 3. The energy for the data transfer would be E1'*50+E2'*80+E3'*50=12 Joules.

Modem Selection Method 2
If have knowledge of Si and Eij, then
for n modems
   each modem has different MCS combinations
   each modem independently chooses the optimal MCS according to link quality
find all possible combinations such that $$\sum_{k} R_{kj} \geq R_{app} + \Delta R_{app},$$

k∈{1, 2, . . . n}
cost function: choose combination with minimum total energy, i.e., minimize:

$$E_{total} = \sum_{k} (S_k + R'_{kj} \times E_{kj})$$

$R'_{kj}=R_{kj}$ if k is not the modem with max(Eij);
else $R'_{kj}$ is difference in required rate and sum of rates from all other modems running at max rate for corresponding MCS.

Figure 15:
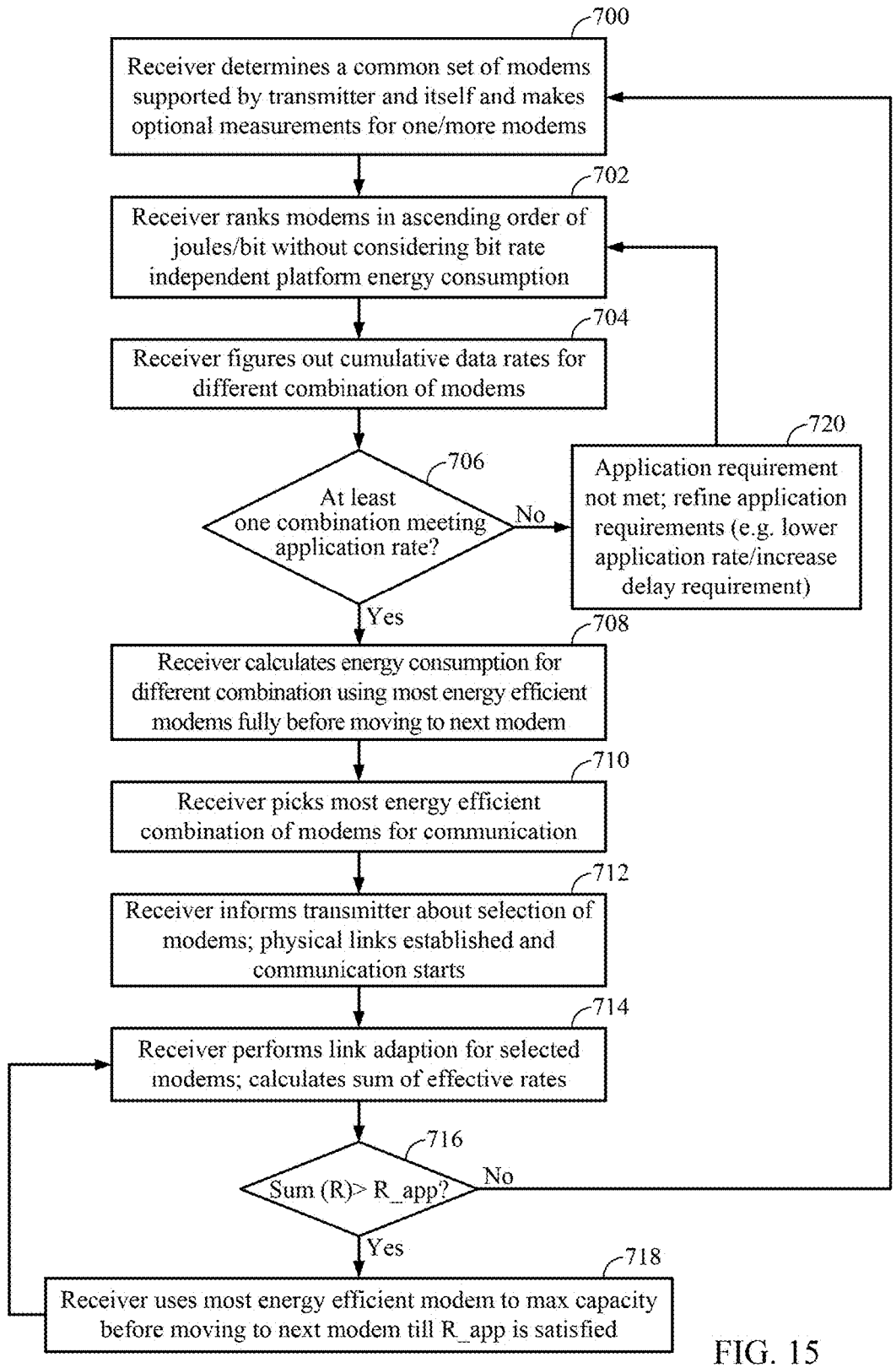
FIG. 15 is a flowchart of a modem selection method according to a second configuration.

FIG. 15 is a flow chart of a modem selection method of a second configuration for the processing system 304. As shown in FIG. 15, the receiving device determines a common set of modems supported by itself and the transmitting device and may make additional measurements for one or more of the common modems (700). While FIG. 15 is directed to a receiving device, the flow chart is also applicable to a transmitting device. Next, the receiving device ranks modems in ascending order of their energy efficiency (702). The receiving device then determines cumulative capacity data rates for different combinations of modems (704). If none of the combinations satisfies the requisite data rate, the receiving device lowers the application QoS requirements (720). If one of the combinations satisfies the requisite data rate as required by the QoS requirements, the receiving device calculates the energy consumption for each of the different combinations (708). The receiving device selects the most energy efficient combination for communication (710). The receiving device informs the transmitting device of the selection, establishes physical links, and initiates the wireless communication (712). The receiving device performs link adaptation for the selected modems and calculates a sum of the effective rates (714). If the sum is greater than the requisite data rate (716), the receiver will use the most energy efficient modem to the maximum capacity before utilizing the next modem (718).

Table 3 below provides an example of energy efficiencies and capacity bit rates for a plurality of modems.

TABLE 3

Energy Table with knowledge of platform energy Si

|  | Modem 1 | Modem 2 | Modem 3 | Modem 4 |
| --- | --- | --- | --- | --- |
| Si (Joule) | 2.0 | .5 | .8 | 1.2 |
| Eij (Joule/Mbit) | 0.05 | 0.055 | 0.06 | 0.08 |
| Rij (Mbps) | 50 | 80 | 100 | 150 |

If the desired Rapp is 180 Mbps, then according to the modem selection method 2 and FIG. 15, the receiving device would select modems 2 and 3. The energy for the data transfer would be 11.7 Joules.

Figures 16, 17:
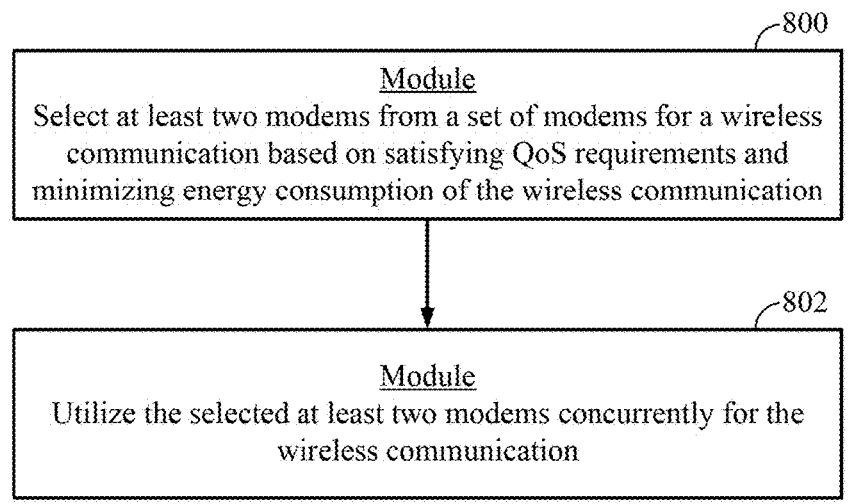
FIG. 16 is a module block diagram of the functionality of an exemplary apparatus.
FIG. 17 illustrates the format of an Application Specific Information Element (ASIE).

FIG. 16 is a block diagram depicting functionality of an exemplary apparatus 300. The exemplary apparatus 300 includes a module 800 for selecting, within the apparatus, at least two modems from a set of modems for a wireless communication based on QoS requirements for and an energy consumption of the wireless communication. The exemplary apparatus 300 further includes a module 802 for utilizing the selected at least two modems concurrently for the wireless communication. The modules 800, 802 are within the processing system 304 of FIG. 3.

In one configuration, the module 800 is a means for selecting, within an apparatus, at least two modems from a set of modems for a wireless communication based on quality of service requirements for and an energy consumption of the wireless communication and the module 802 is a means for utilizing the selected at least two modems concurrently for the wireless communication. In such a configuration, both means are the processing system 304 of FIG. 3.

The processing system 304 may be further configured to select the at least two modems based on satisfying the QoS requirements and on minimizing the energy consumption of the wireless communication. In one configuration, the processing system 304 is configured to determine a common set of modems, which are part of the wireless interface 302, with another apparatus with which the apparatus 300 is communicating. The processing system 304 is configured to obtain a capacity bit rate and an energy efficiency for each modem in the common set of modems. The processing system 304 is further configured to determine subsets of modems in the set of modems that together, based on the capacity bit rate for each of the modems in the set of modems, would provide a requisite bit rate as required by the QoS requirements. The processing system 304 is further configured to determine an energy efficiency of each of the subsets of modems and to select one of the subsets with the best energy efficiency.

Thus, for example, if modems A, B, and D are common with another apparatus and none of the modems by themselves are sufficient to provide the requisite bit rate as required by the QoS requirements, the processing system 304 is configured to determine which of the combinations of modems A, B; A, D; B, D; and A, B, D would provide the requisite bit rate as required by the QoS requirements. The processing system 304 then determines the energy efficiency of each of the combinations of subsets and selects the subset with the best energy efficiency.

In one configuration, the processing system 304 determines when the QoS requirements are not being met, selects a new set of modems that satisfy the QoS requirements and minimize the energy consumption, and utilize the new set of modems concurrently.

Upon selecting the set of modems to utilize for a wireless communication with another apparatus, the processing system 304 is configured to inform the other apparatus of the selection so that the other apparatus can transmit or receive through the selected modems.

The processing system 304 is also configured to obtain metric information and energy efficiency information for each modem in the common set of modems, to obtain QoS requirements for an application that runs on the apparatus 300, to determine at least two modems that would satisfy the QoS requirements based on the obtained metric information, and to determine that the at least two modems would minimize energy consumption for the wireless communication based on the obtained energy efficiency information. The QoS requirements include a bit rate, a bit error rate, and a latency. The energy efficiency information may include a component that is independent of the data transfer and a component that is dependent on the bit rate. The dependent component, which is dependent on the bit rate, is also dependent on the selected MCS for the data transfer. The metric information includes an estimate related to a data rate, a SNR ratio, an LQI, an LUI, a packet error rate, or a MAC transfer queue length.

In one configuration, the processing system 304 is configured to determine the estimate based on previous measurements of performance metrics and an increasing or decreasing linear or nonlinear trend (e.g., Taylor series expansion) related to the performance metrics.

Each radio may be equipped with a sensing module that determines a channel availability time, and the number of OFDM channels, and the subset of OFDM sub-carriers that are available. (For example, an unlicensed technology such as UWB needs to be aware of shared spectral occupancy of other wireless technologies to avoid usage of those spectral resources).

The channel availability factor $\mu$ indicates the fraction of time on the channel that is available to a transmitting wireless node. A PHY rate of X Mbps is equivalent to an application rate of $\alpha$ X when the radio is being used. So the effective app rate is $\alpha \mu$ X over some period of time. When using OFDMA, one may use a fraction $\beta$ of subchannels so that available PHY rate is $\beta$ X, where X is an average PHY rate over all sub-channels. As such, the effective app rate is $\alpha \mu (\beta X)$.

Therefore, factors such as a fraction of channel availability time, protocol stack overheads, and partial allocation of spectral resources (such as in an OFDMA system) result in an effective $\eta = \alpha \mu \beta$ fraction of PHY rate X being available for an application.

Therefore $R_{app}(t) = \Sigma_i \eta_i R_{phy,i}(t)$ and $R'_{app}(t) = \Sigma_i \eta_i R'_{phy,i}(t)$. The sensing module for a radio monitors $R_{phy}(t)$ and estimates $R'_{phy}(t)$. Due to mobility considerations, $R'_{phy}(t)$ may vary significantly for each radio. The sensing module may also monitor the capabilities of each of the OFDM sub-channels, so that the estimate $R_{phy,i}(t)$ is determined with the knowledge of each of capabilities of each OFDM sub-channels. Alternatively, $R_{phy,i}(t)$ may just be an average estimate for the OFDM channel over all available sub-channels.

The apparatus 300 has knowledge of the effective application rate $R_{app}(t)$ being submitted to each radio and estimates the $\eta_i$ efficiency factor with respect to each radio i. Based on the distribution of resources to the radios, the apparatus 300 estimates a rate of change of the application data rate $R'_{app}(t)$. The efficiency factor $\eta_i$ may vary as a function of time, however in this description, for the determination of a rate of change of the APP or PHY data rate, $\eta_i$ is assumed constant in the current region of operation.

Based on the knowledge of $R'_{app}(t)$ and $R'_{phy,i}(t)$, a future trend for the physical layer and application layer data rates may be predicted: $R_{phy,i}(t+\Delta t) = R_{phy,i}(t) + R'_{phy,i}(t) \Delta t$; and $R_{app}(t+\Delta t) = R_{app}(t) + R'_{app}(t) \Delta t$. Based on a predicted future value of $R'_{app}(t)$ and $R'_{phy,i}(t)$, the apparatus 300 proactively adapts the usage of its multi radio resources by assuming an effective physical layer rate for each radio, and an application layer rate that is an interpolated value between the current rate and a predicted rate.

For time t' in the time interval [t, t+$\Delta$t], the average effective physical and application layer data rates are determined $R_{phy,i,eff}(t') = (1-\rho_i) R_{phy,i}(t+\Delta t) + \rho_i R_{phy,i}(t)$ and $R_{app,eff}(t') = (1-\lambda) R_{app}(t+\Delta t) + \lambda R_{app}(t)$, where a typical value for $\rho_i$ and $\lambda$ is 0.5. The effective rates are used by the apparatus 300 for decision making to determine an optimal allocation of the application data bits to the physical radios on the platform.

Devices may periodically advertise current resources available for communication for each modem using mechanisms such as beacon transmissions or wireless wide area network (WWAN) transmissions. Devices may also advertise the modems that are compatible/incompatible with each available modem. Modems may be compatible or incompatible for a number of reasons such as a minimum required isolation between modems, thermal limitations, RF limitations, additional limitations imposed by software defined radios, and hardware limitations. These limitations will vary from device to device depending on the implementation. The devices that want to communicate together need to figure out the different combinations of compatible modems and then select one of the combinations.

A device updates its resource list, i.e., the list of available modems if it desires to disable one or more modems or one or more modems are selected for communication with another device and therefore are no longer available for any new communication. A device can also send a probe to its neighbor (with which it wants to communicate) asking for its current resource/modem capabilities. The recipient of the probe can sends its modem capabilities in a similar way as it advertises its modem capabilities. A device can optionally send, or send if asked by the peer device, expected channel utilization on specific channels for some modems. This information can be used in the modem selection process. A device can optionally ask a peer device to send training sequences on some modems (on specific channels) to make link quality measurements and use this information in the modem selection process. Once a combination of modems is selected, the receiving device notifies the transmitting device about the selection of the modems.

FIGS. 17-26 illustrate a mechanism for device modem capability and modem selection exchange in a peer-to-peer network. The receiving device needs to be aware of the modems supported by the transmitting device so that while deciding the optimal set of modems, it does not consider any modem(s) not supported by the transmitting device. After the decision, the receiving device needs to inform the transmitting device the combination of modems it wants to use for the impending communication so that the transmitting device and receiving device are synchronized and can enable the selected set of modems.

In the following description, a lightweight mechanism with minimal overhead is proposed for exchange of device modem capabilities amongst devices in a piconet. All devices in a piconet are assumed to support at least one common modem (for which they have joined the piconet). This can be 802.11, UWB, or any other PAN/LAN technology.

Step 1:

In one configuration, all devices that form a WiMedia piconet, send beacons during the Beacon Period of the superframe (duration 65.536 us) and synchronize the Beacon Period Start Time (BPST) with each other. Each device occupies one Beacon slot (duration 85 us) to negotiate with other devices. A new Information Element (IE), specifically an Application Specific Information Element (ASIE), may be used so that each device can advertise its modem capability, i.e., the modems it supports and that can be used in subsequent communication. The devices can update the list of modems supported if it desires to shut off some specific modem(s) for whatever reason or if the modems are already being used by some other application. Thus, the modems advertised in the ASIE can potentially be used for a subsequent communication until they are removed from the list in a subsequent beacon frame.

FIG. 17 illustrates the format of an Application Specific Information Element (ASIE). The Element ID field is set to 255 for ASIE. The Length field is set to the length, in octets, of the IE-specific fields that follow. The IE-specific fields contain information specific to the IE. The Specifier ID field is set to a 16-bit value that identifies a company or organization that is responsible for the definition of the application-specific control frames, command frames, IEs, and Probe IEs.

FIG. 18 illustrates the ASIE format for modem capability support. FIG. 19 illustrates a format of the modem capability field. Each device advertises in the ASIE the modems that it supports and includes the ASIE in the beacon frame. In the ASIE each device also sends a bitmap of incompatible (or compatible) modems for each supported modem, the number of modems for a given protocol (e.g., multiple 802.11g modems might be supported especially when using SDRs), regulatory information such as the country of operation, a transmit power level, and channels supported. The bitmap for modem incompatibility (or compatibility) may be defined. The modem capability information is exchanged even before the start of communication between a pair of devices. The end devices figure out the different compatible combinations and then select the desired combination.

The encoding for the Modem Id field is defined in Table 4.

TABLE 4

Modem Id Encoding

| Value | Protocol |
| --- | --- |
| 0 | UWB 1.2 |
| 1-4 | Reserved |
| 5 | 802.11a |
| 6 | 802.11b |
| 7 | 802.11g |
| 8 | 802.11n |
| 9-16 | Reserved |
| 17 | BT 1.2 |
| 18 | BT 2.0 + EDR |
| 19-22 | Reserved |
| 23 | Flash Linq |
| 24-25 | Reserved |
| 26 | Peanut |
| 27-255 | Reserved |

The channels supported for a given modem are ranked in the IEs in the order of their appearance (earlier appearing channels have higher ranks) according to the order of preference of the transmitting device. The information about static modem parameters can be used by the receiving device to run the modem selection algorithm and the channels for a specific modem. As an example, the receiving device can choose a channel for a given modem for which the sum of the ranks (transmitting device and receiving device) is maximized.

In addition, the receiving device can send an Application-specific Probe IE to the transmitting device asking for transmitting device modem capability. This Application-specific Probe IE can be sent as a command frame or can be included in the beacon frame. However, there needs to be separate distributed reservation protocol (DRP) reservations or a prioritized contention access (PCA) period (devices need to support PCA) if a command frame is used. Additional DRP reservations may need to be made for each pair of devices that want to communicate.

The Application-specific Probe IE is used to request an application-specific IE from a device. FIG. 20 illustrates an application specific probe IE format. FIG. 21 illustrates an application specific probe IE format for device capability. The Application Specific Request information field format is defined as in Table 5.

TABLE 5

Application Specific Request Information
Format in Application Specific Probe IE

| Bits | Application Specific Request |
| --- | --- |
| B0 | Modem Capability |
| B1-B7 | Reserved |

The Target DevAddr field is set to the DevAddr of the device from which an ASIE is requested. The Specifier ID is set to a 16-bit value that identifies a company or organization. The owner of the Specifier ID defines the format and use of the Application-specific Request Information field. In response to this Application Specific Probe IE from the receiving device, the transmitting device sends the ASIE for modem capability support, as shown in FIG. 18, either in a beacon frame or in a command frame.

Step 2:

FIG. 22 illustrates an ASIE format for a link measurement request. FIG. 23 illustrates a link measurement request format. The receiving device can optionally ask the transmitting device to transmit a training sequence on one or more channels of one or more modems (and optionally send channel utilization for each of them). The receiving device can then measure dynamic parameters about the links (SINR, RSSI, PER, etc.) before running the modem selection algorithm. This can be sent either in a beacon frame or in a command frame from the receiving device to the transmitting device.

The encoding for the Modem Id field is as defined in Table 4. After receiving this ASIE, the transmitting device will turn on these modems (if they are not) and start sending training sequences for a certain minimum duration of time (which can be negotiated). The receiving device measures the link quality (SNR, RSSI, PER, etc.) to collect the dynamic channel parameters and uses this information for the modem selection algorithm.

Step 3:

The receiving device runs the algorithm for selecting the optimum set of modems from the list of common modems supported by both the transmitting device and receiving device and from optional link quality measurements (Step 2).

Step 4:

After the receiving device decides which set of modems to use to communicate with the transmitting device, it informs the transmitting device about its selection.

In one configuration, an ASIE may be used in which the receiving device indicates what modems it has selected for communication with a specific transmitting device. This ASIE is may be included in the beacon frame of the receiving device or be sent as a command frame. In the latter case, an additional DRP reservation needs to be made or devices need to support PCA for sending the command frame.

FIG. 24 illustrates an ASIE format for modem selection. FIG. 25 illustrates a modem enable request field format. The Target DevAddr field is set to the DevAddr of the transmitting device for which the modem selection information is meant. The Modem Selection Countdown field is set to the number of remaining superframes before the physical link is established between transmitting device and receiving device for a given modem, after which they follow protocol specific association and authentication procedures and finally start exchanging data frames. The encoding for the Modem Id field is as defined in Table 4.

While a pair of devices are communicating, due to varying channel conditions, the QoS requirements might not be met with the current set of modems, i.e., the current set of modems might not still be the optimal set of modems. Further, the transmitting device might not be able to have all the modems for the given application if there are other high priority applications that need one specific modem being currently used. Under such scenarios, the receiving device might be triggered to reselect the optimal set of modems. Furthermore, the receiving device can periodically, or driven by a trigger, ask the transmitting device to send training sequences for link estimation (the transmitting device can be configured to periodically send training sequences using some or all modems that are not currently used). After the receiving device runs the algorithm for selecting the optimal set modems it informs the transmitting device after which both devices use the new set of modems for communication. Thus the modem selection algorithm is run at the start and at regular intervals or is trigger driven.

Figure 26:
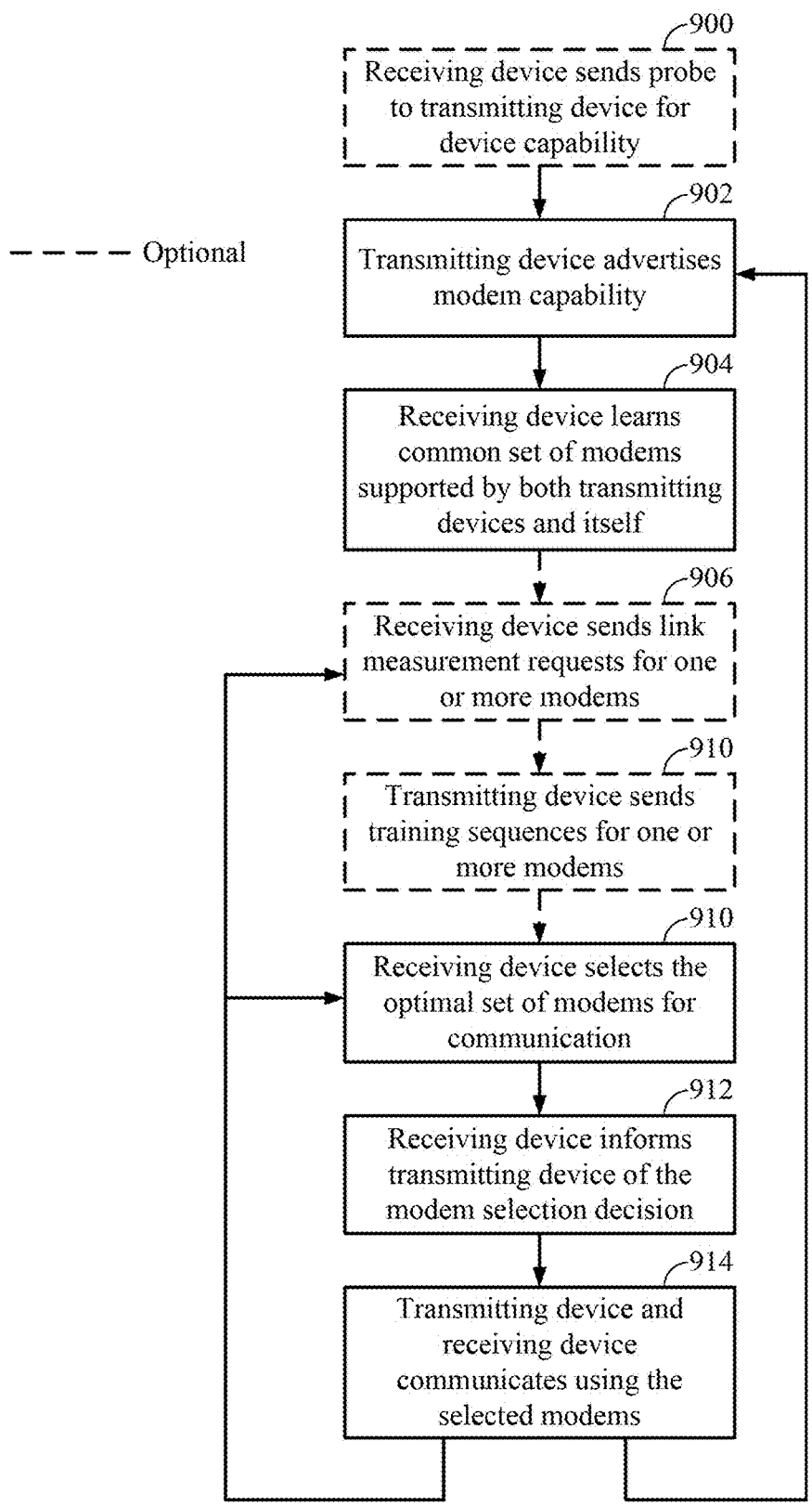
FIG. 26 is a flowchart of an exemplary operation of an exemplary apparatus.

FIG. 26 is a flowchart of an exemplary operation of an exemplary apparatus. The check-outline blocks are optional, as indicated. As shown in FIG. 26, the receiving device sends a probe to a transmitting device for device capability (900). The transmitting device advertises modem capability (902). The receiving device determines, or otherwise learns, the common set of modems supported by both the transmitting device and the receiving device (904). The receiving device sends link measurement request for the one or more common modems (906). The transmitting device sends training sequences for the one or more common modems (908). The receiving device then selects the optimal set of modems for communication (910). As described supra, the receiving device selects the modems based on satisfying QoS requirements while maximizing energy efficiency. The receiving device informs the transmitting device of the modem selection decision (912). Then, the transmitting device and the receiving device communicate using the selected modems (914).

For a given selection of modems, the scheduler observes the queue lengths of the selected modems and does traffic scheduling/load balancing such that the delay is minimized. A variant of stripe protocol or Early Delivery First (EDF) may be implemented. The scheduling is done at packet granularity. Thus it can be thought of as an inner loop while the modem re-selection process is the outer loop that runs less often (every tens of seconds) to reduce the overhead.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communication, comprising:
   selecting, within an apparatus, at least two modems from a set of modems for a wireless communication based on:
   a transmission efficiency for the at least two modems, the transmission efficiency based on a bit rate of the wireless communication and an energy consumption of the at least two modems that is independent of the bit rate, and
   quality of service requirements for the wireless communication as determined by at least one application running on the apparatus;
   wherein the selecting the at least two modems comprises:
   obtaining a capacity bit rate and an energy efficiency for each modem in the set of modems;
   determining combinations of two or more modems in the set of modems that together, based on the corresponding capacity bit rates for each of the modems in the combinations, would provide a requisite bit rate required by the quality of service requirements;
   determining an energy consumption for each of said combinations of two or more modems; and
   selecting one of said combinations of two or more modems with the lowest energy consumption; and
   utilizing the selected at least two modems concurrently for the wireless communication.

2. The method of claim 1, wherein the selecting is based on satisfying the quality of service requirements and minimizing the energy consumption of the at least two modems.

3. The method of claim 1, further comprising:
   determining when the quality of service requirements are not being satisfied; and
   selecting a new set of modems for the wireless communication based on the quality of service requirements for and the energy consumption of the at least two modems, the new set of modems comprising at least two modems; and
   utilizing the new set of modems concurrently for the wireless communication.

4. The method of claim 1, further comprising determining the set of modems by including modems in the set of modems that are common between the apparatus and another apparatus.

5. The method of claim 1, further comprising informing another apparatus of the selected at least two modems.

6. The method of claim 1, further comprising:
   obtaining metric information and energy consumption information for each modem in the set of modems;

obtaining the quality of service requirements for an application on the apparatus;
determining that the at least two modems would satisfy the quality of service requirements based on the obtained metric information for the at least two modems; and
determining that the at least two modems would minimize an energy consumption for the wireless communication based on the obtained energy consumption information, wherein the selecting of the at least two modems from the set of modems for a wireless communication is further based on the determined energy consumption.

7. The method of claim 6, wherein the quality of service requirements comprise a bit rate, a bit error rate, and a latency.

8. The method of claim 6, wherein the metric information comprises at least one estimate related to a data rate, a signal-to-noise ratio, a link quality indicator, a link utilization indicator, a packet error rate, or a media-access-control transfer queue length.

9. The method of claim 8, wherein the at least one estimate is determined based on previous measurements of performance metrics and an increasing or decreasing linear or nonlinear trend related to the performance metrics.

10. The method of claim 1, wherein the energy consumption of the at least two modems is also dependent on a modulation and coding scheme selected for the wireless communication.

11. The method of claim 1, wherein the selecting the at least two modems comprises:
obtaining a capacity bit rate and an energy consumption at the capacity bit rate for each modem in the set of modems;
determining a corresponding energy efficiency per bit for each modem in the set of modems based on the capacity bit rate and the energy consumption at the capacity bit rate and the energy consumption that is independent of the bit rate;
selecting a modem in the set of modems with the best energy consumption per bit; and
repeatedly selecting an additional modem in the set of modems with a next best energy consumption per bit until a sum of the capacity bit rates of the selected modems is greater than or equal to a requisite bit rate as required by the quality of service requirements, said selected modems comprising said at least two modems.

12. The method of claim 11, wherein selecting the at least two modems further comprises:
deselecting one or more of the modems from the selected modems to reduce energy consumption if the sum of the capacity bit rates of the other selected modems is greater than or equal to the requisite bit rate.

13. The method of claim 1, wherein the energy consumption of the at least two modems that is independent of the bit rate is an energy consumed by each of the at least two modems being in an on-state.

14. The method of claim 13, wherein the transmission efficiency for the at least two modems is determined based on the energy consumption of the at least two modems that is independent of the bit rate and a separate dependent component that is energy consumed by each of the at least two modems as a function of a data transmission associated with the wireless communication.

15. An apparatus for wireless communication, comprising:
means for selecting, within an apparatus, at least two modems from a set of modems for a wireless communication based on:
a transmission efficiency for the at least two modems, the transmission efficiency based on a bit rate of the wireless communication and an energy consumption of the at least two modems that is independent of the bit rate, and
quality of service requirements for the wireless communication as determined by at least one application running on the apparatus;
wherein the means for selecting the at least two modems comprises:
means for obtaining a capacity bit rate and an energy efficiency for each modem in the set of modems;
means for determining subsets of modems in the set of modems that together, based on the capacity bit rate for each of the modems in the set of modems, would provide a requisite bit rate as required by the quality of service requirements; and
means for determining an energy efficiency for each of said subsets of modems; and
means for utilizing the selected at least two modems concurrently for the wireless communication.

16. The apparatus of claim 15, wherein the at least two modems are selected based on satisfying the quality of service requirements and minimizing the energy consumption of the at least two modems.

17. The apparatus of claim 15, further comprising:
means for determining when the quality of service requirements are not being satisfied; and
means for selecting a new set of modems for the wireless communication based on the quality of service requirements for and an energy consumption of the new set of modems, the new set of modems comprising at least two modems; and
means for utilizing the new set of modems concurrently for the wireless communication.

18. The apparatus of claim 15, further comprising means for determining the set of modems by including modems in the set of modems that are common between the apparatus and another apparatus.

19. The apparatus of claim 15, further comprising means for informing another apparatus of the selected at least two modems.

20. The apparatus of claim 15, further comprising:
means for obtaining metric information and energy efficiency information for each modem in the set of modems;
means for determining that the at least two modems would satisfy the quality of service requirements based on the obtained metric information for the at least two modems; and
means for determining that the at least two modems would minimize an energy consumption for the wireless communication based on the obtained energy efficiency information.

21. The apparatus of claim 20, wherein the quality of service requirements comprise a bit rate, a bit error rate, and a latency.

22. The apparatus of claim 20, wherein the metric information comprises at least one estimate related to a data rate, a signal-to-noise ratio, a link quality indicator, a link utilization indicator, a packet error rate, or a media-access-control transfer queue length.

23. The apparatus of claim 22, wherein the at least one estimate is determined based on previous measurements of performance metrics and an increasing or decreasing linear or nonlinear trend related to the performance metrics.

24. The apparatus of claim 15, wherein the energy consumption of each of the modems is also dependent on a modulation and coding scheme selected for each of the modems to perform the wireless communication.

25. The apparatus of claim 15, wherein the means for selecting the at least two modems comprises:
means for obtaining a capacity bit rate and an energy efficiency for each modem in the set of modems;
means for selecting a modem in the set of modems with the best energy efficiency; and
means for repeatedly selecting an additional modem in the set of modems with a next best energy efficiency until a sum of the capacity bit rates of the selected modems is greater than or equal to a requisite bit rate as required by the quality of service requirements, said selected modems comprising said at least two modems.

26. The apparatus of claim 25, wherein the means for selecting the at least two modems further comprises:
means for deselecting one or more of the modems from the selected modems to reduce energy consumption of the selected modems if the sum of the capacity bit rates of the other selected modems is greater than or equal to the requisite bit rate.

27. A non-transitory machine-readable medium having stored thereon instructions that, when executed, direct a machine to:
select, within an apparatus, at least two modems from a set of modems for a wireless communication based on:
a transmission efficiency for the at least two modems, the transmission efficiency based on a bit rate of the wireless communication and an energy consumption of the at least two modems that is independent of the bit rate, and
quality of service requirements for the wireless communication as determined by at least one application running on the apparatus;
wherein to select the at least two modems, the machine is further directed to:
obtain a capacity bit rate and an energy efficiency for each modem in the set of modems;
determine subsets of modems in the set of modems that together, based on the capacity bit rate for each of the modems in the set of modems, would provide a requisite bit rate as required by the quality of service requirements;
determine an energy efficiency for each of said subsets of modems; and
select one of said subsets of modems with the best energy efficiency, said one of said subsets of modems comprising said at least two modems; and
utilize the selected at least two modems concurrently for the wireless communication.

28. The machine-readable medium of claim 27, wherein the machine is directed to select based on satisfying the quality of service requirements and minimizing the energy consumption of the at least two modems.

29. The machine-readable medium of claim 27, wherein the machine is further directed to:
determine when the quality of service requirements are not being satisfied;
select a new set of modems for the wireless communication based on the quality of service requirements for and an energy consumption of the new set of modems, the new set of modems comprising at least two modems; and
utilize the new set of modems concurrently for the wireless communication.

30. The machine-readable medium of claim 27, wherein the machine is further directed to determine the set of modems by including modems in the set of modems that are common between the apparatus and another apparatus.

31. The machine-readable medium of claim 27, wherein the machine is further directed to inform another apparatus of the selected at least two modems.

32. The machine-readable medium of claim 27, wherein the machine is further directed to:
obtain metric information and energy efficiency information for each modem in the set of modems;
determine that the at least two modems would satisfy the quality of service requirements based on the obtained metric information for the at least two modems; and
determine that the at least two modems would minimize the energy consumption for the wireless communication based on the obtained energy efficiency information.

33. The machine-readable medium of claim 32, wherein the quality of service requirements comprise a bit rate, a bit error rate, and a latency.

34. The machine-readable medium of claim 32, wherein the metric information comprises at least one estimate related to a data rate, a signal-to-noise ratio, a link quality indicator, a link utilization indicator, a packet error rate, or a media-access-control transfer queue length.

35. The machine-readable medium of claim 34, wherein the at least one estimate is determined based on previous measurements of performance metrics and an increasing or decreasing linear or nonlinear trend related to the performance metrics.

36. The machine-readable medium of claim 27, wherein the energy consumption of each modem—is also dependent on a modulation and coding scheme selected for use by the modem to perform the wireless communication.

37. The machine-readable medium of claim 27, wherein to select the at least two modems, the machine is further directed to:
obtain a capacity bit rate and an energy efficiency for each modem in the set of modems;
select a modem in the set of modems with the best energy efficiency; and
repeatedly select an additional modem in the set of modems with a next best energy efficiency until a sum of the capacity bit rates of the selected modems is greater than or equal to a requisite bit rate as required by the quality of service requirements, said selected modems comprising said at least two modems.

38. The machine-readable medium of claim 37, wherein to select the at least two modems, the machine is further directed to:
deselect one or more of the modems from the selected modems to reduce energy consumption of the selected modems if the sum of the capacity bit rates of the other selected modems is greater than or equal to the requisite bit rate.

39. An apparatus for wireless communication, comprising:
a wireless interface comprising a set of modems; and
a processing system coupled to the wireless interface and configured to:

select at least two modems from the set of modems for a wireless communication based on:
  a transmission efficiency for the at least two modems, the transmission efficiency based on a bit rate of the wireless communication and an energy consumption of the at least two modems that is independent of the bit rate, and
  quality of service requirements for the wireless communication as determined by at least one application running on the apparatus;
  wherein to select the at least two modems, the processing system is configured to:
    obtain a capacity bit rate and an energy efficiency for each modem in the set of modems;
    determine subsets of modems in the set of modems that together, based on the capacity bit rate for each of the modems in the set of modems, would provide a requisite bit rate as required by the quality of service requirements;
    determine an energy efficiency for each of said subsets of modems; and
    select one of said subsets of modems with the best energy efficiency, said one of said subsets of modems comprising said at least two modems; and
  utilize the selected at least two modems concurrently for the wireless communication.

40. The apparatus of claim 39, wherein the processing system is configured to select the at least two modems based on satisfying the quality of service requirements and minimizing the energy consumption of the at least two modems.

41. The apparatus of claim 39, wherein the processing system is further configured to:
  determine when the quality of service requirements are not being satisfied;
  select a new set of modems for the wireless communication based on the quality of service requirements for and an energy consumption of the new set of modems, the new set of modems comprising at least two modems; and
  utilize the new set of modems concurrently for the wireless communication.

42. The apparatus of claim 39, wherein the processing system is further configured to determine the set of modems by including modems in the set of modems that are common between the apparatus and another apparatus.

43. The apparatus of claim 39, wherein the processing system is further configured to inform, through the wireless interface, another apparatus of the selected at least two modems.

44. The apparatus of claim 39, wherein the processing system is further configured to:
  obtain metric information and energy efficiency information for each modem in the set of modems;
  determine that the at least two modems would satisfy the quality of service requirements based on the obtained metric information for the at least two modems; and
  determine that the at least two modems would minimize an energy consumption for the wireless communication based on the obtained energy efficiency information.

45. The apparatus of claim 44, wherein the quality of service requirements comprise a bit rate, a bit error rate, and a latency.

46. The apparatus of claim 44, wherein the metric information comprises at least one estimate related to a data rate, a signal-to-noise ratio, a link quality indicator, a link utilization indicator, a packet error rate, or a media-access-control transfer queue length.

47. The apparatus of claim 46, wherein the at least one estimate is determined based on previous measurements of performance metrics and an increasing or decreasing linear or nonlinear trend related to the performance metrics.

48. The apparatus of claim 39, wherein the energy consumption of each of the at least two modems—is also dependent on a modulation and coding scheme selected for use by the modem to perform the wireless communication.

49. The apparatus of claim 39, wherein to select the at least two modems, the processing system is configured to:
  obtain a capacity bit rate and an energy efficiency for each modem in the set of modems;
  select a modem in the set of modems with the best energy efficiency; and
  repeatedly select an additional modem in the set of modems with a next best energy efficiency until a sum of the capacity bit rates of the selected modems is greater than or equal to a requisite bit rate as required by the quality of service requirements, said selected modems comprising said at least two modems.

50. The apparatus of claim 49, wherein to select the at least two modems, the processing system is further configured to:
  deselect one or more of the modems from the selected modems to reduce energy consumption of the selected modems if the sum of the capacity bit rates of the other selected modems is greater than or equal to the requisite bit rate.

51. A method for wireless communication, comprising:
  determining, for each modem in a set of modems in a wireless device, an energy efficiency of the modem;
  determining, for each modem in the set of modems, a capacity data rate supported by the modem;
  determining, for each of a plurality of combinations of at least two modems in the set of modems, a combined energy efficiency of the combination based on the energy efficiencies of the at least two modems in the combination;
  determining, for each of the plurality of combinations of at least two modems in the set of modems, a cumulative capacity data rate supported by the at least two modems in the combination;
  selecting a one of the plurality of combinations for a wireless communication, the selected one of the plurality of combinations being the combination having the greatest combined energy efficiency that also has a cumulative capacity data rate that satisfies a quality of service requirement for the wireless communication; and
  transmitting the wireless communication using the at least two modems of the selected combination of at least two modems concurrently.

52. The method of claim 51, further comprising
  determining when the quality of service requirement is not being satisfied;
  selecting a second of the plurality of combinations for the wireless communication, the selected one of the plurality of combinations being the combination having the greatest combined energy efficiency that also has a cumulative capacity data rate that satisfies the quality of service requirement for the wireless communication; and
  transmitting the wireless communication using the at least two modems of the selected second combination of at least two modems concurrently.

53. The method of claim 51, further comprising determining the set of modems by including modems in the set of modems that are common between the apparatus and another apparatus.

54. The method of claim 51, wherein the quality of service requirements comprise a bit rate, a bit error rate, and a latency.

55. The method of claim 51, wherein the energy efficiency comprises at least one of a dependent component that is dependent on a bit rate of the wireless communication or an independent component that is independent of the wireless communication.

56. The method of claim 55, wherein the energy efficiency is also dependent on a modulation and coding scheme selected for the wireless communication.

57. The method of claim 51, further comprising informing another apparatus of the selected at least two modems.

58. The method of claim 51, further comprising:
determining a new quality of service requirement in response to none of the combinations providing a cumulative capacity data rate that satisfies the quality of service requirement; and
selecting a one of the plurality of combinations for the wireless communication, the selected one of the plurality of combinations being the combination having the greatest combined energy efficiency that also has a cumulative capacity data rate that satisfies the new quality of service requirement for the wireless communication.

* * * * *